US008825456B2

(12) United States Patent
Vasudevan et al.

(10) Patent No.: US 8,825,456 B2
(45) Date of Patent: Sep. 2, 2014

(54) METHOD AND SYSTEM FOR MULTIPLE DATASET GAUSSIAN PROCESS MODELING

(75) Inventors: Shrihari Vasudevan, Chippendale (AU); Fabio Tozeto Ramos, Erskineville (AU); Eric Nettleton, Research (AU); Hugh Durrant-Whyte, Rozelle (AU)

(73) Assignee: The University of Sydney, Sydney (AU)

(*) Notice: Subject to any disclaimer, the term of this patent is extended or adjusted under 35 U.S.C. 154(b) by 176 days.

(21) Appl. No.: 13/496,480

(22) PCT Filed: Sep. 15, 2010

(86) PCT No.: PCT/AU2010/001196
§ 371 (c)(1),
(2), (4) Date: Mar. 15, 2012

(87) PCT Pub. No.: WO2011/032207
PCT Pub. Date: Mar. 24, 2011

(65) Prior Publication Data
US 2012/0179635 A1     Jul. 12, 2012

(30) Foreign Application Priority Data

Sep. 15, 2009  (AU) ................................ 2009904466
Jan. 19, 2010  (AU) ................................ 2010900196

(51) Int. Cl.
*G06F 7/60*          (2006.01)
(52) U.S. Cl.
USPC .......................................................... 703/2
(58) Field of Classification Search
USPC ....... 703/2; 704/250; 706/12, 20, 21; 367/43; 707/748; 381/94.1; 702/81; 382/154, 382/224
See application file for complete search history.

(56) References Cited

U.S. PATENT DOCUMENTS

| 7,685,080 | B2 * | 3/2010 | Rifkin et al. ..................... 706/20 |
| 8,010,535 | B2 * | 8/2011 | Taylor et al. ................... 707/748 |
| 8,428,915 | B1 * | 4/2013 | Nipko et al. ....................... 703/2 |
| 2003/0191728 | A1 * | 10/2003 | Kulkarni et al. ................. 706/21 |
| 2004/0190732 | A1 * | 9/2004 | Acero et al. .................. 381/94.1 |
| 2004/0225498 | A1 * | 11/2004 | Rifkin ............................ 704/250 |
| 2007/0127824 | A1 * | 6/2007 | Luo et al. ....................... 382/224 |
| 2007/0280528 | A1 * | 12/2007 | Wellington et al. ........... 382/154 |

(Continued)

OTHER PUBLICATIONS

PCT Notification of Transmittal of the International Search Report and the Written Opinion of the International Searching Authority, or the Declaration, for PCT Counterpart Application No. PCT/AU2010/001196, 14 pages, (Nov. 4, 2010).

(Continued)

*Primary Examiner* — Kandasamy Thangavelu
(74) *Attorney, Agent, or Firm* — Blakely, Sokoloff, Taylor & Zafman LLP

(57) ABSTRACT

A method of computerized data analysis and synthesis is described. First and second datasets of a quantity of interest are stored. A Gaussian process model is generated using the first and second datasets to compute optimized kernel and noise hyperparameters. The Gaussian process model is applied using the stored first and second datasets and hyperparameters to perform Gaussian process regression to compute estimates of unknown values of the quantity of interest. The resulting computed estimates of the quantity of interest result from a non-parametric Gaussian process fusion of the first and second measurement datasets. The first and second datasets may be derived from the same or different measurement sensors. Different sensors may have different noise and/or other characteristics.

30 Claims, 20 Drawing Sheets

(56) References Cited

U.S. PATENT DOCUMENTS

2008/0046209 A1* 2/2008 Ding .............................. 702/81
2009/0135670 A1* 5/2009 Deffenbaugh et al. ......... 367/43
2012/0030154 A1* 2/2012 Nicholson et al. .............. 706/12

OTHER PUBLICATIONS

Shrihari Vasudevan, et al. "Gaussian Process Modeling of Large Scale Terrain", 2009 IEEE International Conference on Robotics and Automation, Kobe International Conference Center, Kobe, Japan, pp. 1047-10563, (May 12-17, 2009).

M. A. Osborne, et al., "Towards Real-Time Information Processing of Sensor Network Data using Computationally Efficient Multi-output Gaussian Processes", 2008 International Conference on Information Processing in Sensor Networks, pp. 109-120, (Apr. 22-24, 2008).

E. M. Schetselaar, "Geological Data Integration", Department of Earth Systems Analysis, International Institute for Geo-Information Science and Earth Observation (ITC), retrieved from the Internet on Nov. 9, 2010 from http://web.archive.org/web/20061209032606/http://www.itc.nl/ilwis/applications/application15.asp, 4 pages, (Dec. 9, 2006).

C. E. Rasmussen, et al., "Gaussian Processes for Machine Learning", The MIT Press, Massachusetts Institute of Technology, ISBN 026218253X, www.GaussianProcess.org/gpml, 266 pages, (2006).

Jorge Nocedal, et al., "Numerical optimization", Springer, 12 pages (including Cover Page, Table of Contents, and pp. 192-201), (2006).

Franco P. Preparata, et al., "Computational Geometry: An Introduction", Springer-Verlag, 17 pages (including the Cover Page, Table of Contents, p. 71, pp. 74-79, and Subject Index), (1985).

* cited by examiner (a) GP1(20 points, noise = 0.40), GP2(20points, noise = 0.50)

(b) GP1(20 points, noise = 0.40), GP2(20points, noise = 0.50)

(c) GP1(20 points, noise = 0.10), GP2(20points, noise = 1.00)

(d) GP1(20 points, noise = 0.10), GP2(20points, noise = 0.20)

(e) GP1(20 points, noise = 0.10), GP2(60points, noise = 2.00)

(f) GP1(60 points, noise = 0.10), GP2(20points, noise = 2.00)

WA dataset of 3 overlapping scans

Output of GP Fusion applied to the WA datase. The test data comprises of 1 Million points.

Confidence of the prediction based on GP fusion method. Shaded areas depict regions of higher uncertainty — GP Predictions
— Ground truth

METHOD AND SYSTEM FOR MULTIPLE DATASET GAUSSIAN PROCESS MODELING

CROSS-REFERENCE TO RELATED APPLICATIONS

This patent application is a U.S. National Phase Application under 35 U.S.C. §371 of International Application No. PCT/AU2010/001196, filed Sep. 15, 2010, entitled A METHOD AND SYSTEM FOR MULTIPLE DATASET GAUSSIAN PROCESS MODELING, which claims priority to Australian Patent Application No. 2009904466, filed Sep. 15, 2009, and Australian Patent Application No. 2010900196, filed Jan. 19, 2010.

FIELD OF APPLICATION

This invention relates to a method and system for modeling a dataset using Gaussian processes. The invention may find numerous fields of application from which appropriate datasets may be derived including modeling mining geology or geography or economic data modeling, for example. One particular field of application considered in greatest detail herein relates to computer implemented terrain mapping for robotic navigation and the like.

BACKGROUND

In a large scale environment like an open-cut mine, spatial modeling of geography and geology can have many uses in planning, analysis and operations within the environment. In the case of automated mining, a geographical model or terrain map can be used to guide robotic vehicles, whilst an in-ground geological model of the ore body may be used to determine drilling and blasting operations.

A digital representation of the operating environment in the form of a spatial model is typically generated from sensor measurements which provide a sample of the actual environmental variable being modeled (e.g. elevation in the case of a terrain map, or ore grade in the case of in-ground ore body modeling) at various spatially distinct locations within the operating environment. The measured sample data is then treated in some manner such as by interpolation to determine information about the environment in locations other than those actually measured.

State-of-the-art representations generally map surfaces by computing triangulations. These methods, however, do not have a statistically sound way of incorporating and managing uncertainty. The assumption of statistically independent data is a further limitation of many works that have used these approaches. While there are several interpolation techniques known, the independence assumption can lead to simplistic (simple averaging like) techniques that result in an inaccurate modeling of the terrain.

Gaussian process based terrain modeling provides an approach that enables a multi-resolution representation of space, incorporates and manages uncertainty in a statistically sound way, and can handle spatially correlated data in an appropriate manner. Gaussian Processes (GPs) are stochastic processes based on the normal (Gaussian) distribution and can be used to good effect as a powerful nonparametric learning technique for spatial modeling. Inference of continuous values with a Gaussian process prior is known as Gaussian process regression, and is sometimes referred to as "Kriging" in the geospatial community.

Another difficulty in terrain modeling arises from the limited perceptual capabilities and/or placement opportunities for measurement sensors which renders collected sensory data notably incomplete. Incomplete sensor data can be manifested in a number of different ways. Sensors have an inherent field-of-view and range which limit the region of terrain that can be measured at one time. If the region of interest is larger then multiple sensors (or multiple measurements with one sensor) would be needed to obtain sample measurements across the whole area. Physical occlusions within a sensor field-of-view may also cause incomplete measurement data requiring another sensor placement. Further, various different kinds of sensors may be used to measure terrain in the same region. For example, terrain data can be obtained using numerous sensors including 3D laser scanners and GPS. Laser scanners (sometimes referred to as LIDAR sensors) provide dense and accurate data, whereas a GPS based survey typically comprises a relatively sparse set of well chosen points of interest.

In large scale terrain modeling it may therefore be useful to incorporate multiple sensory snapshots from multiple sensors to obtain the most complete model possible. This will require fusing these multiple and multi-modal sensory datasets to obtain a unified computational model.

SUMMARY OF THE INVENTION

A method of computerised data analysis and synthesis including receiving first and second measurement datasets of relating to a quantity of interest, each dataset comprising a plurality of datapoints, storing the first and second measurement datasets, generating a Gaussian process model by using the first and second datasets to compute optimized kernel and noise hyperparameters, storing the optimized kernel and noise hyperparameters, and applying the Gaussian process model by using the stored first and second datasets and hyperparameters to perform Gaussian process regression to compute estimates of unknown values of the quantity of interest within the domain of interest.

The resulting computed estimates of the quantity of interest result from a non-parametric Gaussian process fusion of the first and second measurement datasets. The first and second datasets may be derived from different measurement sensors, having potentially different noise and/or other characteristics.

To generate a Gaussian process model the method may include using the first dataset to learn optimized kernel hyperparameters and a first noise hyperparameter, and using the learnt kernel hyperparameters and second dataset to learn an optimized second noise hyperparameter. Gaussian process regression may then be performed using the first and second datasets, first and second noise hyperparameters and kernel hyperparameters.

The quantity of interest may be geographical elevation, and the domain of interest may be a mining pit.

The quantity of interest may be a geological characteristic within a body of earth, such as ore grade or the like.

A plurality of measurement datasets may be used, wherein a separate noise hyperparameter is computed for each using the same optimized kernel hyperparameters computed for the first dataset.

The first and second datasets may be stored in a kd-tree data structure for ease of access during the Gaussian process regression.

Generating a Gaussian process model may include using the first dataset to learn first kernel and noise hyperparameters, using the second dataset to learn second kernel and noise hyperparameters, and using the first and second kernel and noise hyperparameters to compute both auto-covariances and cross-covariances, wherein Gaussian process regression is performed using the first and second datasets, first and second kernel and noise hyperparameters and computed auto-covariances and cross-covariances.

The same or different Gaussian process kernels may be used with respect to the first and second datasets.

According to the present invention a system for analysing and synthesising data to estimate a quantity of interest includes a training processor adapted to obtain and store first and second datasets, each comprising a plurality of datapoints, representing separate sets of measurements of the quantity of interest within a domain of interest and generating a Gaussian process model by using the first and second datasets to compute optimized kernel and noise hyperparameters, data storage in communication with the training processor to in use store the first and second datasets and computed hyperparameters, and an evaluation processor in communication with the data storage for applying the Gaussian process model by performing Gaussian process regression using both the stored first and second datasets and stored hyperparameters to compute estimates of unknown values of the quantity of interest within the domain of interest.

The system may include at least one sensor for generating sets of measurements comprising the datapoints of the first and second datasets.

The first and second datasets may be derived from the same sensor, or may be derived from different sensors having different noise and/or other characteristics.

The training processor may use the first dataset to learn optimized kernel hyperparameters and a first noise hyperparameter, and use the learnt kernel hyperparameters and the second dataset to learn a second noise hyperparameter. The evaluation processor may use both the first and second datasets, respective first and second noise hyperparameters, and kernel hyperparameters for Gaussian process regression.

The data storage may include a kd-tree data structure for storage and access to the first and second datasets.

The training processor may use the first dataset to compute first kernel and noise hyperparameters and use the second dataset to compute second kernel and noise hyperparameters and use the first and second kernel and noise hyperparameters to compute both auto-covariances and cross-covariances. The evaluation processor may use the first and second datasets, first and second kernel and noise hyperparameters and computed auto-covariances and cross-covariances for Gaussian process regression.

The same or different Gaussian process kernels may be used with respect to the first and second datasets.

When the auto-covariance and cross-covariance is computed, the method may include modelling similarity between the data sets, or modelling tasks if data sets describing different quantities are used.

In some implementations the first dataset comprises color data. In these implementations, the second dataset may comprise data other than color data.

Many other possible features and aspects will become apparent from the detailed description which follows.

BRIEF DESCRIPTION OF THE DRAWINGS

The following description explains details of the invention to enable it to be more fully understood in the context of an embodiment thereof, also referring to the illustrations in the accompanying drawings in which.

DETAILED DESCRIPTION

Figure 1:
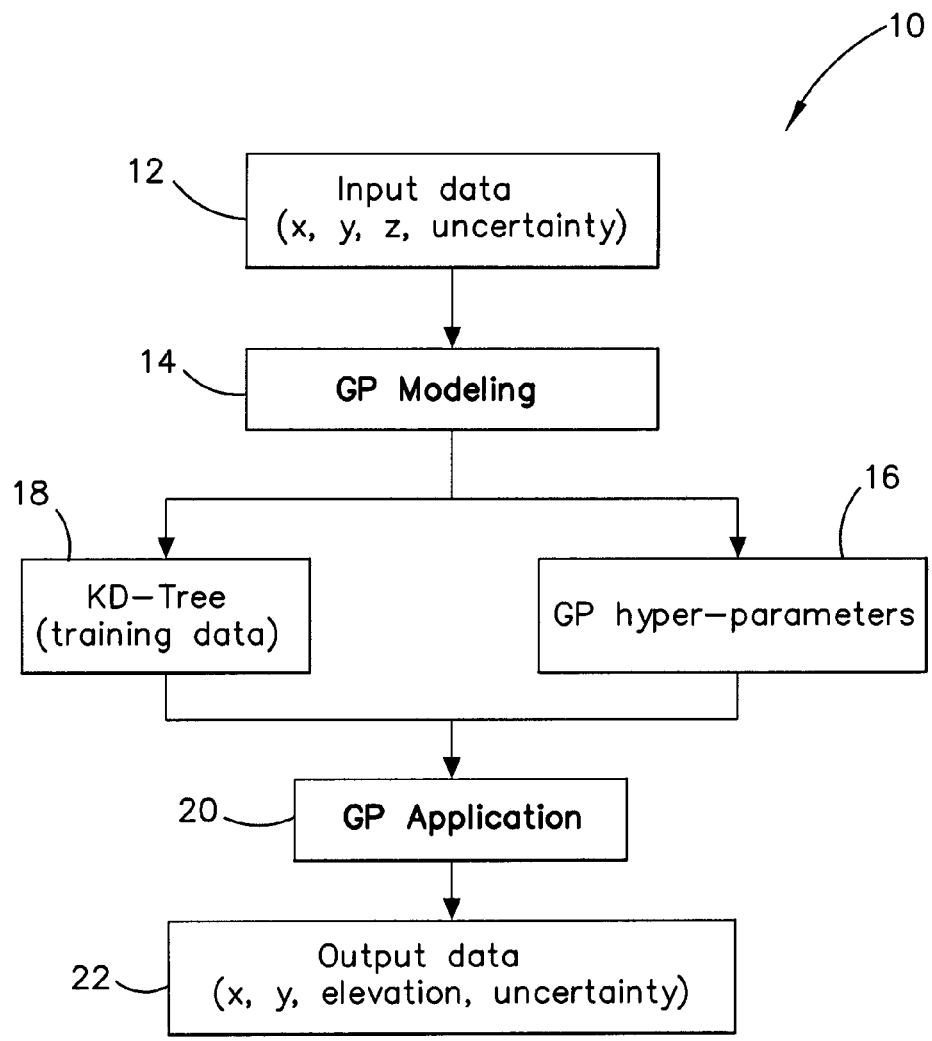
FIG. 1 is a flow-chart diagram illustrating an overall procedure for Gaussian process digital terrain modeling.

The present invention may be applied to digital terrain modeling as described hereinbelow in a non-limiting example of its implementation. Other forms of spatial data modeling may also be applicable, such as in-ground ore-grade estimation, as well as other data modeling applications which may be found in other branches of engineering or economics, including environmental sciences, hydrology, robotics and forecasting.

In a large scale environment like an open-cut mine spatial modeling of geography and geology can have many uses in planning, analysis and operations within the mining environment. In the case of automated mining, a geographical model or terrain map can be used to guide robotic vehicles, whilst an in-ground geological model of the ore body may be used to determine drilling and blasting operations.

A digital representation of the operating environment in the form of a spatial model can be generated from sensor measurements which provide a sample of the actual environmental variable being modeled (e.g. elevation in the case of a terrain map, or ore grade in the case of in-ground ore body modeling) at various spatially distinct locations within the operating environment. The measured sample data is then treated in some manner such as by interpolation to determine information about the environment in locations other than those actually measured.

To model the surface terrain of a mine, sample data can be generated from measurements of ground elevation (height) at discrete locations within the mine pit region. The sample data can then be analysed and, using a method of interpolation, synthesised into a model that can be used to make predictions of ground elevations at spatial locations distinct from those that were measured. These estimates together with the measurements provide a more complete picture of the mine surface terrain than the sample data taken alone.

A mathematical technique that has been found useful for analyzing data in this way is the Gaussian process (GP), which is a stochastic process based on the normal (Gaussian) distribution and can be used to good effect as a powerful nonparametric learning technique for spatial modeling. Governed by an appropriate kernel or covariance function, the Gaussian process can be used to infer continuous values within the spatial domain from the distribution of sample measurements. The concept of Gaussian processes and their application are described in *Gaussian Processes for Machine Learning* (MIT Press, 2006) by C. E. Rassmussen and C. K. I. Williams, which is incorporated herein by reference in its entirety.

Gaussian processes provide a powerful learning framework for learning models of spatially correlated and uncertain data. Gaussian process regression provides a robust means of estimation and interpolation of elevation information and can handle incomplete sensor data effectively. GP's are non-parametric approaches in that they do not specify an explicit functional model between the input and output. They may be thought of as a Gaussian Probability Distribution in function space and are characterized by a mean function $m(x)$ and the covariance function $k(x, x')$ where $$m(x) = E[f(x)] \quad (1)$$

$$k(x,x') = E[(f(x)-m(x))(f(x')-m(x'))] \quad (2)$$

such that the GP is written as $$f(x) \sim GP(m(x), k(x,x')) \quad (3)$$

The mean and covariance functions together specify a distribution over functions. In the context of the problem at hand, each $x \equiv (x, y)$ and $f(x) \equiv z$ of the given data.

The covariance function models the relationship between the random variables which, here, correspond to the given data. Although not necessary, the mean function $m(x)$ may be assumed to be zero by scaling the data appropriately such that it has an empirical mean of zero. There are numerous covariance functions (kernel) that can be used to model the spatial variation between the data points. The most popular kernel is the squared-exponential kernel given as $$k(x, x') = \sigma_f^2 \exp\left(-\frac{1}{2}(x-x')^T \Sigma (x-x')\right) \quad (4)$$

where $k(x; x')$ is the covariance function or kernel;

$$\Sigma = \begin{bmatrix} l_x & 0 \\ 0 & l_y \end{bmatrix}^{-2}$$

is the length-scale matrix, a measure of how quickly the modeled function changes in the directions x and y;

$\sigma_f^2$ is the signal variance.

The set of parameters $l_x$, $l_y$, $\sigma_f$ are referred to as the hyperparameters and specify what sort of values the parameters of the model might take.

Another kernel that may be used is the neural network kernel. It is specified by $$k(x, x') = \sigma_f^2 \arcsin\left(\frac{\beta + 2x^T \Sigma x'}{\sqrt{(1+\beta+2x^T \Sigma x)(1+\beta+2x'^T \Sigma x')}}\right) \quad (5)$$

where $\beta$ is a bias factor, and $l_x$, $l_y$, $\sigma_f$, $\beta$ are the hyperparameters used. Alternatively, the classical neural network kernel form given below may also be used. This form may be preceeded by a $\sigma_f^2$ which is an optional term. Both the form in equation (5) and the one given below are equivalent—the classical form simply incorporates the bias factor into the length scale matrix and augments the data vectors to incorporate the $\beta$ term.

$$k(x, x') = \frac{2}{\pi} \arcsin\left(\frac{2\tilde{x}^T \Sigma \tilde{x}'}{\sqrt{(1+2\tilde{x}^T \Sigma \tilde{x})(1+2\tilde{x}'^T \Sigma \tilde{x}')}}\right)$$

The main difference between these two kernels is that the squared-exponential kernel, being a function of $|x-x'|$ is stationary (invariant to translation) whereas the neural network function is not so. In practice, the squared exponential function has a smoothing or averaging effect on the data. The neural network covariance function proves to be much more effective than the squared exponential covariance function in handling discontinuous (rapidly changing) data and has been shown to be very effective in modeling complex terrain data.

Typically, for dense and large data sets, not all of the data is required for learning the GP model. Such an approach may not scale due to computational complexity of the process. Thus, a sampling step may be included in which a subset of the measurement data is selected. This selection may be of uniform nature, random, or could employ a heuristic approach such as preferential sampling from areas of high gradient.

Training the GP for a given data set is tantamount to optimizing the hyperparameters of the underlying kernel. For the squared-exponential kernel this amounts to finding the optimal set of values for $\theta = \{l_x, l_y, \sigma_f, \sigma_n\}$, and for the neural network kernel the optimal values for $\theta = \{l_x, l_y, \sigma_f, \beta, \sigma_n\}$, where $\sigma_n^2$ represents the noise variance in the data being modeled. This is performed by formulating the problem in a Maximum Marginal Likelihood Estimation framework and subsequently solving a non-convex optimization problem.

Defining $X=\{x_i\}_{i=1}^n=(x_i,y_i)_{i=1}^n$ and $z=\{f(x_i)\}_{i=1}^n=(z_i)_{i=1}^n$ as the sets of training inputs and outputs respectively with n instances, the log marginal likelihood of the training outputs (z) given the set of locations (X) and the set of hyperparameters θ is given by $$\log(z|X,\theta) = -\frac{1}{2}z^T K_z^{-1} - \frac{1}{2}\log|K_z| - \frac{n}{2}\log(2\pi) \quad (6)$$

where $K_z=K(X,X)+\sigma_n^2 I$ is the covariance matrix for all noisy targets z and $K(X, X)$ is covariance matrix for the noise-free targets (using equation 4 or 5).

The log marginal likelihood has three terms—the first describes the data fit, the second term penalizes model complexity and the last term is simply a normalization coefficient. Thus, training the model will involve searching for the set of hyperparameters that enables the best data fit while avoiding overly complex models.

Using this maximum likelihood approach, training the GP model on a given set of data amounts to finding the optimal set of hyperparameters that maximize the log marginal likelihood (Eq. 6). This can be done using standard off-the-shelf optimization approaches. For example, a combination of stochastic search (simulated annealing) and gradient descent (Quasi-Newton optimization with BFGS hessian update) has been found to be successful. Using a gradient based optimization approach leads to advantages in that convergence is achieved much faster. A description and further information about these optimization techniques and others can be found in the text *Numerical Optimization*, by J. Nocedal and S. Wright (Springer, 2006).

Applying the GP model amounts to using the learned GP model to estimate the elevation information across a region of interest, characterized by a grid of points at a desired resolution. The 2.5D elevation map can then be used as is or as a surface map for various applications. The estimation is achieved by performing Gaussian process regression at the set of query points, given the training data set and the GP kernel with the learnt hyperparameters.

For additive independent identically distributed Gaussian noise with variance $\sigma_n^2$ the prior on the noisy observations becomes $$\operatorname{cov}(z_p,z_q)=k(x_p,x_q)+\sigma_n^2\delta_{pq} \quad (7)$$

where $\delta_{pq}$ is a Kroeneker Delta function, $\delta_{pq}=1$ iff p=q and 0 otherwise.

The joint distribution of any finite number of random variables of a GP is Gaussian. Thus, the joint distribution of the training outputs z and test outputs $f_*$ given this prior can be specified by $$\begin{bmatrix} z \\ f_* \end{bmatrix} \sim N\left(0, \begin{bmatrix} K(X,X)+\sigma_n^2 I & K(X,X_*) \\ K(X_*,X) & K(X_*,X_*) \end{bmatrix}\right) \quad (8)$$

For n training points and $n_*$ test points, $K(X, X_*)$ denotes the $n \times n_*$ matrix of covariances evaluated at all pairs of training and test points and similarly for $K(X, X)$, $K(X_*, X_*)$ and $K(X_*, X)$. The function values ($f_*$) corresponding to the test locations ($X_*$) given the training inputs X, training outputs z and covariance function (kernel) is given by $$\bar{f}_*=K(X_*,X)[K(X,X)+\sigma_n^2 I]^{-1}z \quad (9)$$

and their uncertainty is given by $$\operatorname{cov}(f_*)=K(X_*,X^*)-K(X_*,X)[K(X,X)+\sigma_n^2 I]^{-1}K(X,X_*) \quad (10)$$

FIG. 1 is a flow-chart diagram illustrating the overall procedure (10) of Gaussian process digital terrain modeling. Measured terrain data, along with measurement noise estimates, are provided from a sensor as input (12) to the process. The modeling step (14) then learns the appropriate Gaussian process model (hyper-parameters of the kernel), and the result of the modeling step are the GP hyperparameters (16) together with the training data (18). The training data is stored in a KD-Tree data structure, the benefits of which are explained in greater detail below. The training data and hyperparameters are then used to perform Gaussian process regression (20) to estimate the elevation data across a user specified grid of points, for example. The result (22) is a 2.5D elevation map of the terrain as well as the associated uncertainty for each estimated point.

Figure 2:
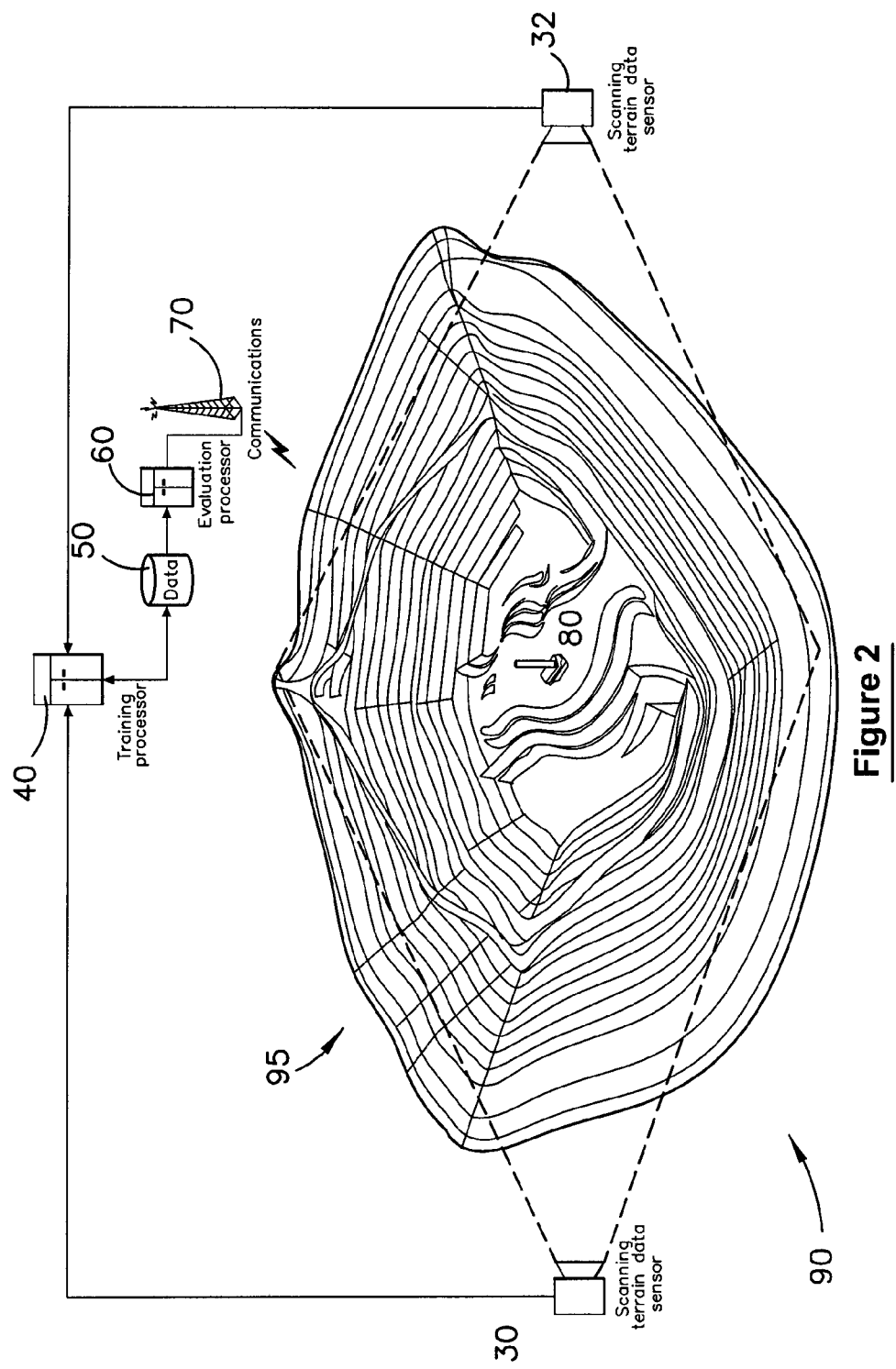
FIG. 2 is a diagrammatic illustration of a terrain region and a system adapted for generating and maintaining a corresponding digital terrain model using Gaussian process techniques.

FIG. 2 is a diagrammatic illustration of a terrain region and a system adapted for generating and maintaining a corresponding digital terrain model using Gaussian process techniques. The system shown and described below may find application in controlling autonomous vehicles, for example, in environments such as open-pit mining. The terrain modeling system 90 operates on a terrain region 95 in the form of an open pit mine, and utilises one or more measurement sensors 30, 32 that provide measured terrain data about the region 95. The sensors 30, 32 provide spatial data measured from the terrain region 95 which can be generated by a number of different methods, including laser scanning, radar scanning, GPS or manual survey. One example of an appropriate measurement sensor is the LMS Z420 time-of-flight laser scanner available from Riegl. This form of sensor can be used to scan the environment region and generate a 3D point cloud comprising (x, y, z) data in three frames of reference.

The measurement data generated by the sensors is provided to a training processor 40 coupled to data storage 50. The training processor 40 is adapted to organise the sensor data and determine a non-parametric, probabilistic, multi-scale representation of the data for use in terrain modeling, which is stored in the data storage 50. Details of specific operational procedures that may be carried out by the training processor are described hereinbelow and particularly with reference to FIG. 3.

An evaluation processor 60 is also coupled to access the data storage 50 and is adapted to utilise the data from the data storage 50 and terrain model data according to a desired modeling grid resolution. Specific operational details of the evaluation processor are provided hereinbelow and particularly with reference to FIG. 4. Once the terrain model data has be generated it can be communicated to an autonomous robotic vehicle 80, operating within the modeled environment, by a suitable communications medium 70, such as a radio communication link.

Figure 3:
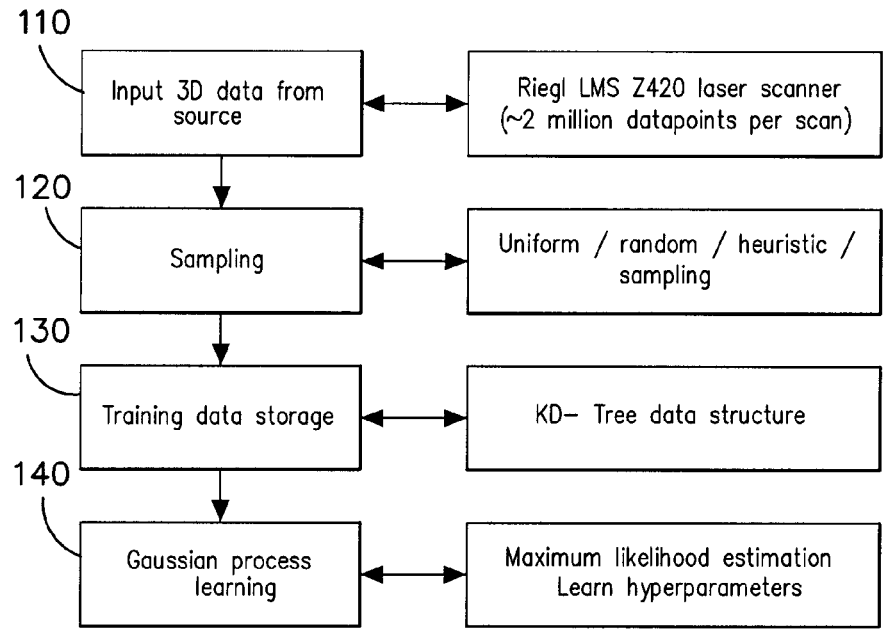
FIG. 3 is a flow-chart diagram showing a training phase procedure for a terrain data modeling process.

FIG. 3 is a flow-chart diagram showing a training phase procedure 100 for a terrain data modeling process. The procedure 100 begins with obtaining sensor measurement data at step 110 from an appropriate source, in this case a Riegl LMS Z420 3D laser scanner. The laser scanner mentioned generates of the order of two-million data points for a given scan. In order to reduce the computational complexity involved with dealing with such a large dataset, a sampling stage is employed at step 120 to reduce the number of data points to be used for actually generating the terrain model. If the measurement data were obtained from GPS surveying, or some other relatively sparse sensor methodology the sampling step may be omitted. A number of different sampling strategies can be successfully employed, including uniform sampling, random sampling, or an informed/heuristic selection approach (for instance, selecting preferentially in areas of high gradient or the like). By way of example, the sampling step 120 may be used to reduce the sensor measurement dataset from millions of datapoints down to thousands of datapoints.

Following the sampling stage, the subset of the data that is to be used for training is stored, at step 130, in an appropriate data structure for further use. Many different data structures exist and the present application makes use of an efficient, hierarchical data structure known as a KD-Tree. The KD-Tree provides for rapid data access in the inference process and addresses scalability issues related to applying the proposed method in the context of large datasets. A description of the KD-Tree data structure can be found, for example, in *Computational Geometry: An Introduction*, by F. P. Preparata and M. I. Shamos (Springer, 1993).

The data storage step is followed by a Gaussian process learning procedure at step 140, with the objective of learning a representation of the spatial data. Details of a Gaussian process learning procedure are provided herein. This method provides for a non-parametric, probabilistic, multi-scale representation of the data. No explicit assumption of the underlying functional model is made. In particular, a maximum likelihood estimation method is used in order to optimise a set of hyperparameters associated with the Gaussian process kernel. The kernel hyperparameters provide a coarse description of the terrain model, and can be used together with the sampled sensor measurement data to generate detailed terrain model data at any desired resolution, including a statistically sound uncertainty estimate. The optimized kernel hyperparameters are stored, together with the KD-Tree sample data structure, for use in the evaluation procedure.

Figure 4:
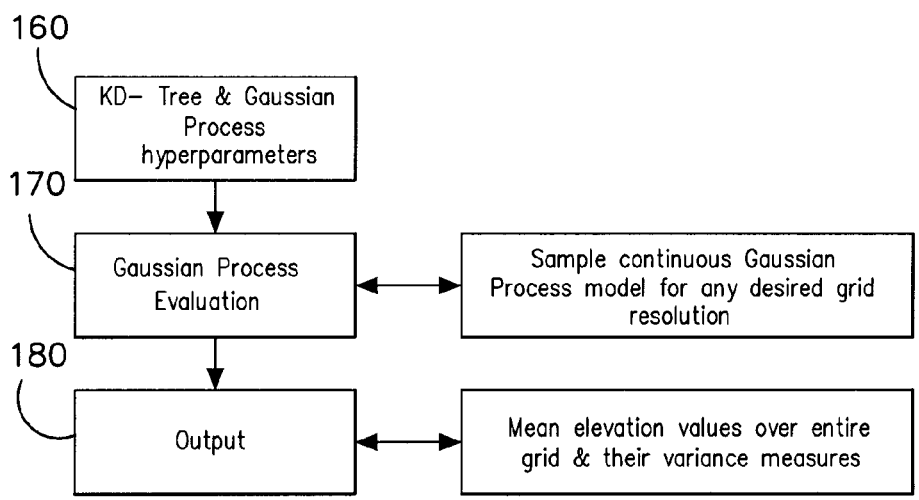
FIG. 4 is a flow-chart diagram showing an evaluation phase procedure for a terrain data modeling process.

FIG. 4 is a flow-chart diagram showing an evaluation procedure 150 for a terrain data modeling process. The sensor measurement spatial data stored in the KD-Tree and the Gaussian process model hyperparameters obtained in the learning phase are used here (160). Since the Gaussian process representation obtained is a continuous domain one, applying the model for any desired resolution amounts to sampling the model at that resolution. This can be performed at step 170 as outlined below.

A grid in the area of interest, at the desired resolution is formed. The objective is to use the learnt spatial model to estimate the elevation at individual points in this grid. Each point in the grid is interpolated with respect to the model learnt in the previous step and the nearest training data around that point. For this step, the KD-Tree naturally and efficiently provides access to the nearest known spatial data. This together with the learnt model provides an interpolation estimate for the desired location in the grid. The estimate is also accompanied with an uncertainty measure that is simultaneously computed in a statistically sound manner.

The inference stage may use a KD-Tree based local approximation strategy in order to obtain a suitable tradeoff between local smoothness and feature preservation, as well as to address scalability concerns in applying the approach to large scale datasets. During the inference process, the KD-Tree that initially stored the training/evaluation data is queried to provide a predefined number of spatially closest data, to the point for which the elevation must be estimated. The GP regression process then uses only these training exemplars to estimate the elevation at the point of interest. This process provides two advantages—it tends to achieve a desirable locally adaptive GP effect, and it simultaneously addresses the scalability issue that arises when applying this approach to large scale data sets. The local KD-Tree approximation may use a distance filtering step to avoid inconsistent or highly uncertain estimates being formed by using points from multiple datasets which are very far apart. This is particularly relevant to the case of overlapping laser scans where one is a very noisy or displaced version of the other—possible due to bad data registration for instance. This is also possible in a sparsely populated region of a single dataset or in fringe areas of the dataset near occlusions.

The output 180 of the Gaussian process evaluation from step 170 is a digital elevation map/grid at the chosen resolution and region of interest together with an appropriate measure of uncertainty for every point in the map. The digital elevation map may be used as is or may be rapidly processed into a digital surface/terrain model and used thereafter for robotic vehicle navigation and the like in known fashion.

In the system 90 illustrated in FIG. 2, two separate scanners 30, 32 are shown disposed to opposite sides of the terrain to be modeled so as to minimise occlusions and the like. Mapping large-scale terrain may require more than one sensor location to make measurements across the entire region of interest due to limitations of the sensor itself or limitations on where the sensor can physically be located. Even though the aforementioned laser scanning sensor can generate millions of sample measurements, some of which may be later discarded for ease of computation, the terrain of interest may dictate that multiple sensor locations are necessary to reach all major surfaces. Also, more than one type of sensor may be used to collect terrain measurement data, including various kinds of laser scanning, radar, and GPS surveying, each having different measuring characteristics.

Figure 5:
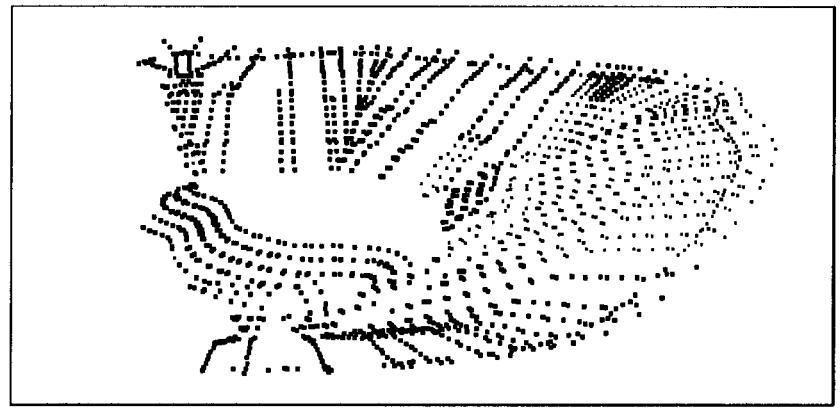
FIGS. 5, 6 and 7 provide an illustration of data resulting from the use of multiple sensors in large scale terrain measurement.
Figure 6:
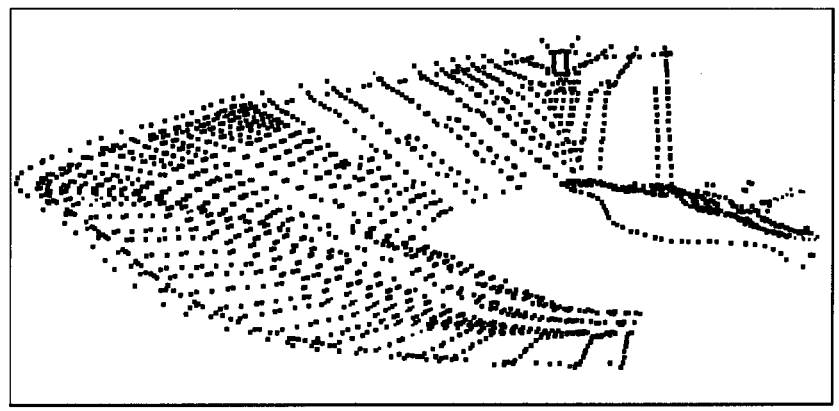
Figure 7:
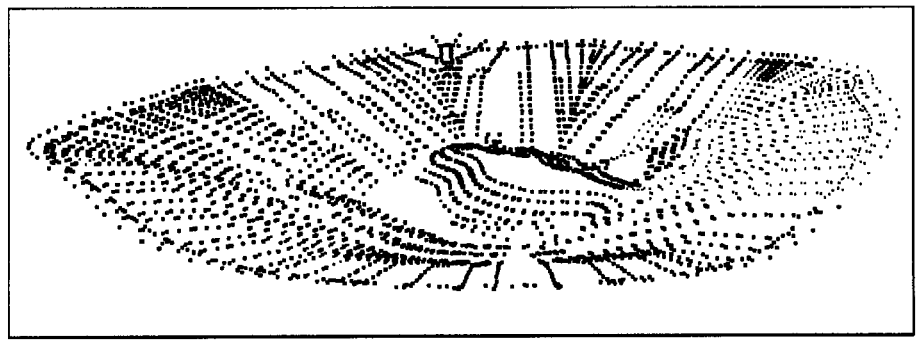

FIGS. 5, 6 and 7 provide an illustration of data resulting from the use of multiple sensors in large scale terrain measurement. FIGS. 5 and 6 show representations of measurement data samples that may be generated by the sensors 30 and 32, respectively, as seen in FIG. 2. As is apparent from the Figures, neither individual sensor is able to produce measurement samples across the range of the terrain of interest. However, if the two measurement datasets can be combined, as represented in FIG. 7, a more complete overall terrain model will result.

There are various ways in which multiple measurement datasets can be combined to generate a unified digital terrain model, even within the context of a Gaussian process terrain modeling framework. Non-parametric Gaussian process fusion herein refers to methods that produce a fused data estimate based on the input datasets. The fusion process results in a Gaussian process that is still dependent on the datasets that were used to produce it in the first place. In the following, non-parametric Gaussian process fusion techniques are described in further detail with particular focus on differently noisy datasets and dependent Gaussian processes. Experimental results are also presented.

Differently Noisy Datasets

Gaussian process fusion in the context of large-scale terrain modeling can be understood as follows. Given multiple sensors (GPS, laser etc.) that provide multiple terrain datasets (each spanning a certain area), each of which comprising of a set of points (x, y, z) in 3D space, the objectives are to:

a) develop a multi-resolution representation that incorporates the sensor uncertainty in an appropriate manner.

b) be able to best handle the limitations of the sensor—(i) incomplete sensor information due to occlusions and (ii) limited perceptual capability (range) and applicability.

Figure 8:
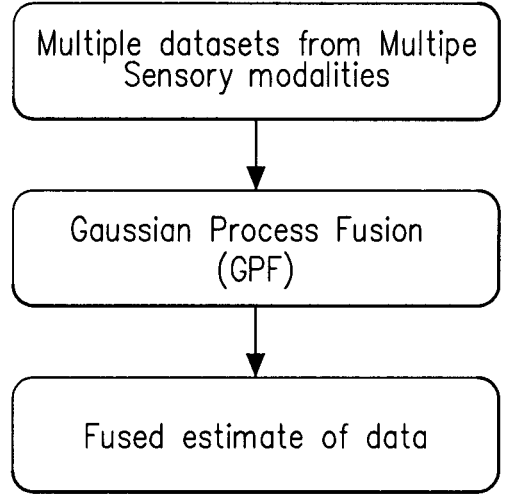
FIG. 8 illustrates an overall procedure for estimating data by combining multiple datasets from multiple sensor modalities using non-parametric Gaussian process fusion outlined in the form of a flow-chart diagram.

The overall procedure for estimating data by combining multiple datasets from multiple sensor modalities using non-parametric Gaussian process fusion is outlined in the form of a flow-chart diagram in FIG. 8.

Joint Hyper-Parameter Learning

One method of non-parametric Gaussian process fusion is referred to as joint hyper-parameter learning. The key ideas are that datasets from the same entity can be modeled using a single set of GP hyper-parameters with just the noise parameter varying between them. The datasets are considered as differingly noisy samples of a common terrain that has to be modeled. The fusion problem is treated as a standard GP regression/estimation problem with data having different noise parameters.

In principle, the idea is to jointly sample from the individual datasets and perform a learning procedure to find the best kernel hyper-parameters and noise parameters characterizing each of the datasets. These, along with the training/evaluation data from the datasets are used to produced the fused estimate of the entity being modeled.

Figure 9:
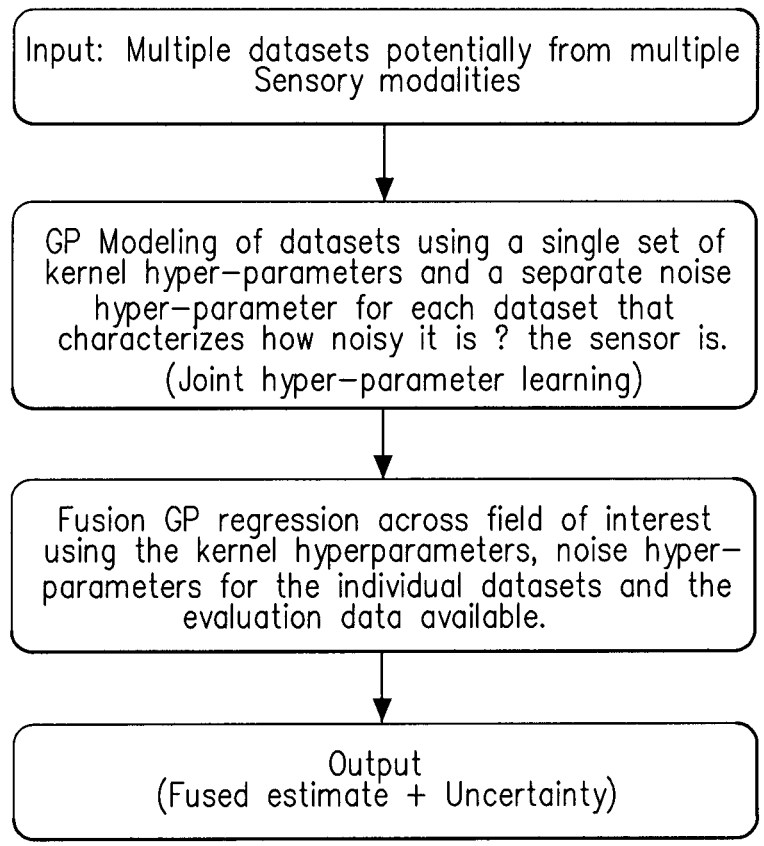
FIG. 9 is a flow-chart diagram illustrating a method for non-parametric Gaussian process fusion by joint hyper-parameter learning.

A method for non-parametric Gaussian process fusion by joint hyper-parameter learning, from an input of multiple datasets potentially from multiple sensor modalities, is outlined in a flow-chart diagram shown in FIG. 9. Gaussian process modeling of the multiple datasets uses a single set of kernel hyper-parameters and a separate noise hyper-parameter for each dataset that characterises how noisy it is. The hyper-parameters are jointly learned using data from all of the datasets. Fusion GP regression can then be performed across a field of interest using the kernel hyper-parameters and noise hyper-parameters for the individual datasets and the evaluation data available to yield output comprising a fused data estimate and associated uncertainty.

However, the joint hyper-parameter learning approach may encounter two difficulties when implemented in practice. First, the computations required raise issues of scalability when there are too many and/or large datasets. Second, local optima issues may be encountered in jointly learning the hyper-parameters, which means they may not be more optimal than those obtained if the datasets were modeled separately.

In order to avoid these issues, a constrained optimization approach can be adopted as described below.

Constrained Optimization

The constrained optimization fusion methodology is based on two underlying ideas 1) Data from the same entity can be modeled using a single set of GP hyperparameters (as suggested by the optimization method) with just the noise parameter varying between datasets. Thus, the datasets are just considered as differingly noisy samples of a common terrain that has to be modeled.

2) The fusion problem is treated as a standard GP regression/estimation problem with data having different noise parameters. The formulation is very similar to the standard formulation detailed earlier.

Non-parametric Gaussian process fusion of differingly noisy datasets using constrained optimization achieves a similar result to joint hyperparameter learning but handles scalability and local optima issues in a better way. The first dataset is modeled using standard GP modeling techniques. Its hyperparameters will include length-scales and a noise value. For each other dataset, a constrained optimization process is used to find out its noise hyperparameter given the length-scales from the first dataset. The result at the end of the process is one set of length scales and as many noise hyper-parameters as the number of datasets. Thereafter standard GP regression techniques may be used.

Figure 10:
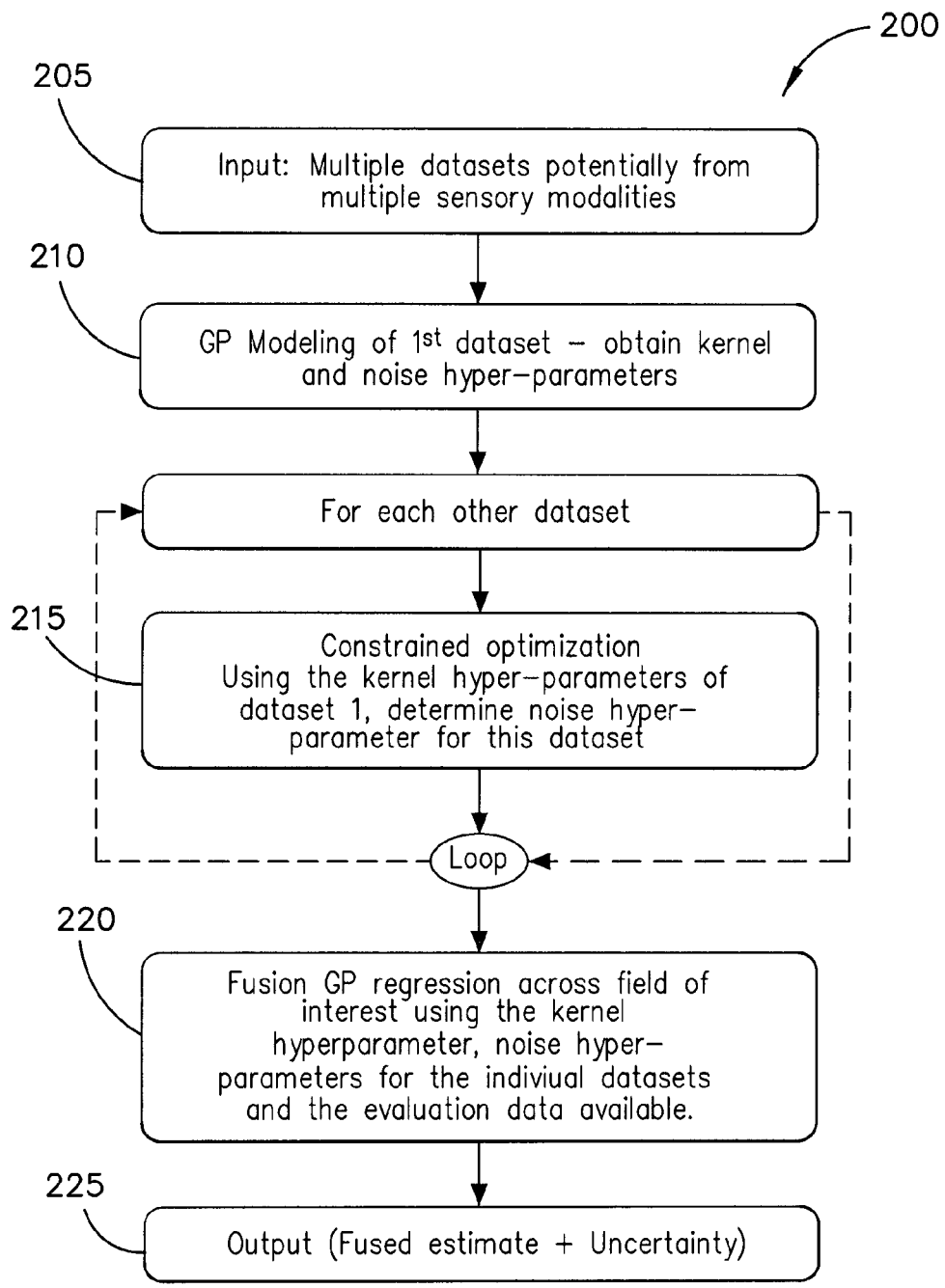
FIG. 10 illustrates the steps involved in Gaussian process fusion using constrained optimization in the form of a flow-chart procedure.

FIG. 10 illustrates the steps involved in Gaussian process fusion using constrained optimization in the form of a flow-chart procedure 200. The input (205) comprises multiple datasets which are potentially derived from multiple sensor modalities, as discussed hereinabove. For a first dataset a full Gaussian process learning procedure is performed (210), as described hereinabove in relation to single dataset GP's. Thereafter for every successive dataset of the same entity, a constrained optimization procedure is adopted (215) in which the hyperparameters of the first GP are fixed and only the noise parameter is adjusted to model the individual datasets. The end result is a single set of Gaussian process hyperparameters along with a set of noise parameters corresponding to each of the datasets. Estimating data is performed by Gaussian process regression (220) across the field of interest using the kernel hyper-parameters, noise hyper-parameters for the individual datasets, and the evaluation data available. The resulting output (225) is a fused estimate and uncertainty based on the multiple datasets and sensor characteristics. In the case of terrain modeling, the estimation using this Gaussian process fusion process basically estimates the expected elevation at a point given the differently noisy data obtained from the respective datasets in the vicinity.

The actual fusion step is formulated as follows. Given multiple datasets (possibly multi-modal) of the entity being modeled, the objective is to estimate the elevation at a point given all prior datasets as well as the respective GP's (hyper-parameters) that are used to model them. This can be formulated as $$E[f_*(x_*)] \ \& \ \mathrm{var}(f_*(x_*))|X_i, GP_i, x_* \qquad (11)$$

where i varies from 1 to the number of datasets available.

The mathematical formation of the problem and its solution is as follows: the joint distribution of any finite number of random variables of a GP is Gaussian. Thus, the joint distribution of the training outputs z and test outputs $f_*$ given this prior can be specified by $$\begin{bmatrix} z \\ f_* \end{bmatrix} \sim N\left(0, \begin{bmatrix} K(X, X) + \Sigma & K(X, X_*) \\ K(X_*, X) & K(X_*, X_*) \end{bmatrix}\right) \qquad (12)$$

where $$z = [z_1, z_2, z_3, \ldots, z_n]'$$

is the output elevation values of the selected training data from the individual datasets, $$X = [X_1, X_2, X_3, \ldots, X_n]$$

are the input location values of the selected training data from the respective individual datasets and $$\Sigma \mathrm{diag}[\sigma_{1\{1\ldots N_1\}}^2, \sigma_{2\{1\ldots N_2\}}^2, \ldots, \sigma_{n\{1\ldots N_n\}}^2]$$

is a diagonal noise matrix where each noise term is repeated as many times as the number of training data taken from the corresponding dataset, denoted by $N_1, N_2, \ldots, N_n$.

Only one set of hyperparameters are used with the noise parameter only varying across datasets. These hyperparameters may be obtained as shown in FIG. 10 by doing a constrained optimization (fixing all but the noise parameter) or alternatively by selecting training data from each of the datasets and doing a joint learning exercise as though one large dataset was being modeled. The latter option is of course computationally more expensive and is limited to the resources available. In the experimental results presented below, small scale simulation experiments demonstrate the joint learning procedure, whereas the large scale real datasets involving several hundred thousand data points use the constrained optimization technique.

The kernel used in GP fusion could be any of the ones presented earlier or other standard kernels. Using the neural network kernel presented earlier, for n training points and $n_*$ test points, $K(X, X_*)$ denotes the $n \times n_*$ matrix of covariances evaluated at all pairs of training and test points and similarly for $K(X, X)$, $K(X_*, X_*)$ and $K(X_*, X)$. The training data applied to perform the estimation are obtained through the aforementioned KD-Tree local approximation and distance-filtering steps. The mean and variance of the elevation can consequently be estimated from equations (9) and (10), with the changes detailed above. Multiple, multi-modal datasets modeled by Gaussian processes may thus be fused to generate more complete terrain models.

Experimental Results from Differently Noisy Datasets: Neural Network Kernel

Experiments were performed using the neural network kernel described above in equation 5, both with simulated data as well as real world datasets. The former was used to understand the behaviour of the fusion algorithm and the latter was used to demonstrate the approach in real world settings. The objective of the simulation experiments was to test the functioning of the fusion method for different cases by observing its behaviour in each case.

The plots depicted in FIGS. 11(a)-(f) illustrate the various cases attempted in one experiment. Table I lists the corresponding mean squared error (MSE) and confidence check results. Note that each test is denoted by the sampling and noise parameters for the two datasets.

It is clear that for comparable uncertainties of individual datasets/GP's, the final fused output is more correct and more certain than either of the sources. When one source is significantly more noisy, even with possibly many more samples, the final estimate remains unaffected and only becomes more certain due to the presence of the extra information (the second dataset).

TABLE I

GP Fusion Analysis: Simulation
Each dataset is represented by (num, noise) and an associated GP.
MSE of fused estimate (GPF) is checked over 10 points

| Drawing Figure | Dataset1 (num1, noise1) | Dataset2 (num2, noise2) | Mean Squared Error (MSE) (GP1, GP2, GP Fused) | Increase in Uncertainty (Uncertainty of GPF > GP1 or GP2) |
|---|---|---|---|---|
| 11(b) | 20, 0.4 | 20, 0.5 | [0.015 0.093 0.0008] | 0 |
| 11(c) | 20, 0.1 | 20, 1.0 | [0.003 0.578 0.003] | 0 |
| 11(d) | 20, 0.1 | 20, 2.0 | [0.001 0.797 0.001] | 0 |
| 11(e) | 20, 0.1 | 60, 2.0 | [0.001 0.033 0.001] | 0 |
| 11(f) | 60, 0.1 | 20, 2.0 | [0.0003 0.332 0.0002] | 0 |

Figure 11A:
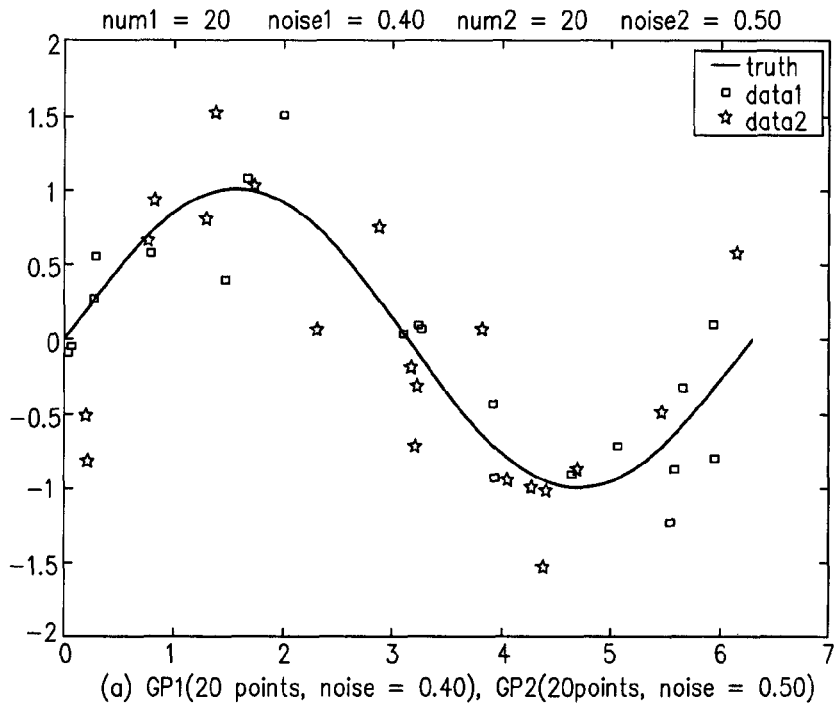
FIGS. 11(a)-(f) depicts plots illustrating the results of the various cases in one experimental demonstration.
Figure 11B:
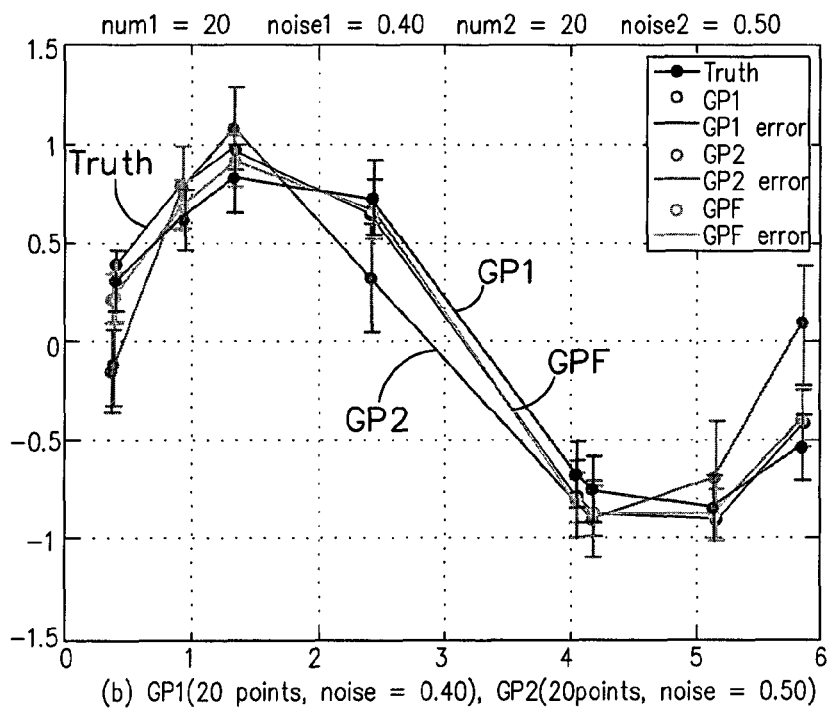
Figure 11C:
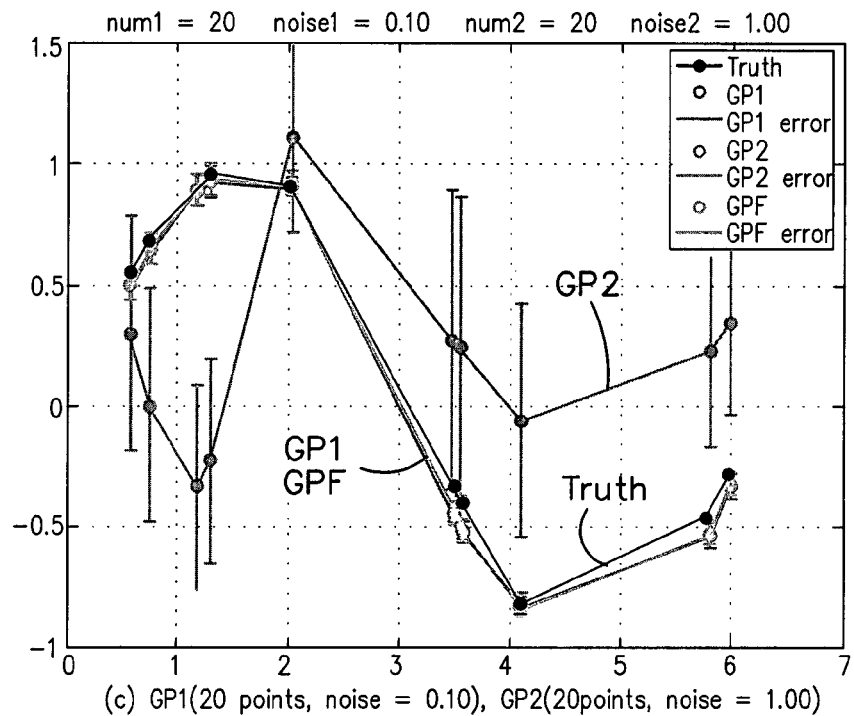
Figure 11D:
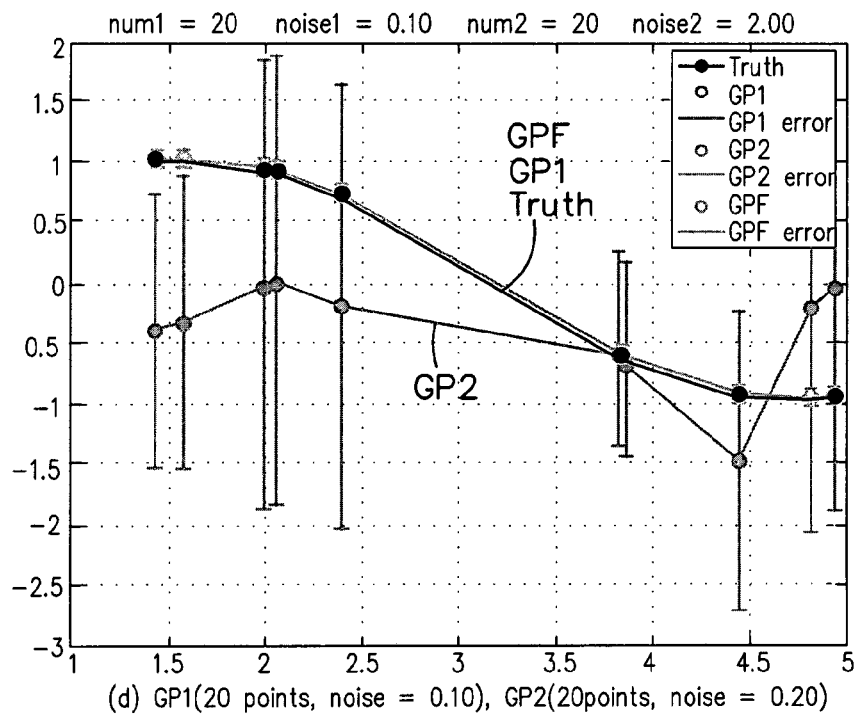
Figure 11E:
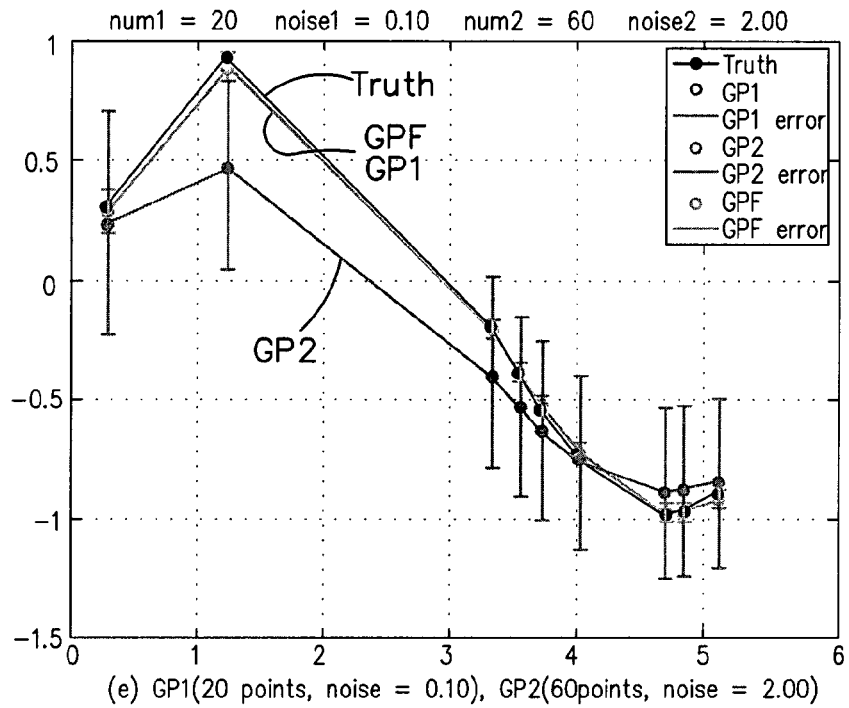
Figure 11F:
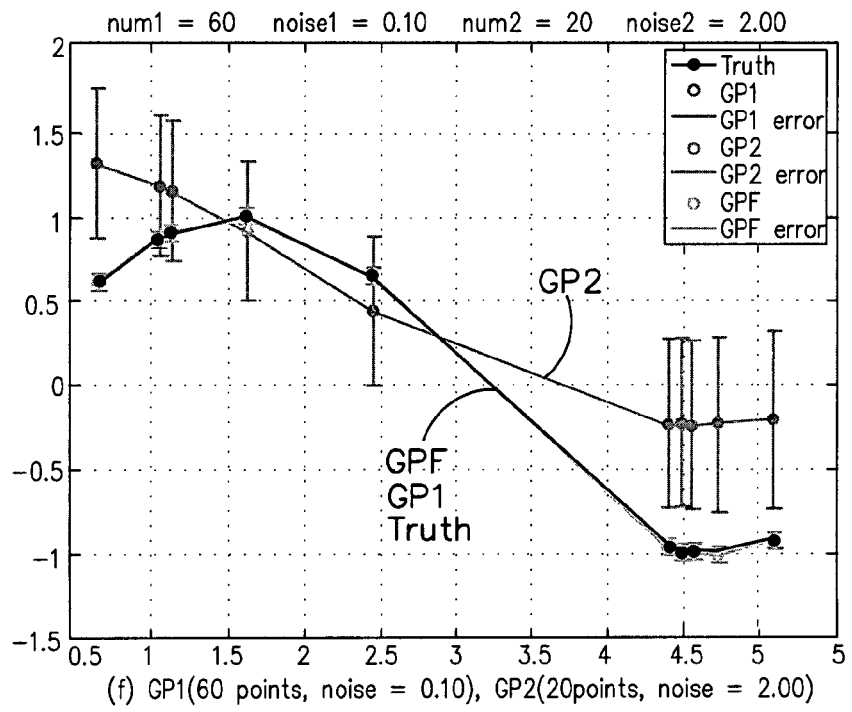

FIG. 11(a) depicts the "ground truth"—a simple sine wave and two differingly noisy sets of samples (data1 and data2) are randomly drawn from this wave. In this simple example the solid line represents the entity to be modeled and the plotted datapoints represent the sensory data obtained from two different sensors. In this case one sensor (data1) returns 20 observations with noise 0.4 whilst another sensor (data2) produces 20 observations with noise 0.5 (FIG. 11(a)). FIGS. 11(b)-(f) depict outcomes of different cases from applying the standard GP modeling procedure for each of the noisy samples individually as well as that obtained through fusion of the two datasets. Overall it is apparent that the fused Gaussian process result (GPF) performs better than either of the individual Gaussian processes (GP1, GP2) in that it closely follows the truth and has lower uncertainty than the input GP's.

Figure 12:
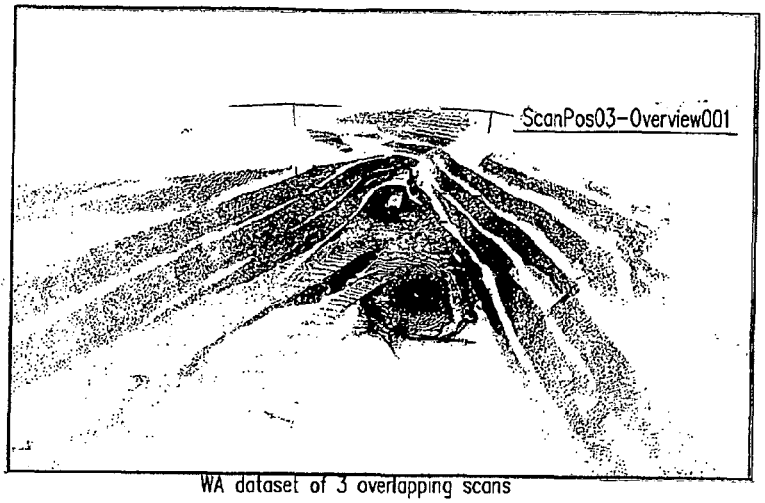
FIG. 12 depicts one experimental dataset that comprises three scans taken using a laser scanner at the West Angelas mine in Western Australia.

Experiments were also performed on real world datasets. One dataset used is depicted in FIG. 12 and comprises three scans taken using a RIEGL LMSZ420 laser scanner at the West Angelas mine in Western Australia. Each scan had on an average about 500,000 points spread over about 1.8×0.5 sq km. Although not easily distinguishable in the drawing, the scans cover different areas and overlap to different extents. The objective of the experiment was to fuse the three scans in order to produce a more complete picture of the West Angelas mine.

From the first dataset, 10000 points were uniformly selected. The mean squared error (MSE) was computed across this set after each fusion step. Table II depicts the checks that were performed and corresponding results obtained. Clearly, the MSE decreases with each successive scan that is included in the fusion and there is no increase in uncertainty—both, due the availability of more information in the form of a new dataset. These results clearly show that the algorithm works. As a separate test, the order of the scan fusion was reversed with scan 2 being fused with scan 1. This test also yielded similar results thus validating the functioning of the method.

TABLE II

GP Fusion Analysis: WA dataset
3 scans, 500000 points per scan over 1.8 × 0.5 sq km, 10000 test points

| Scans | Mean Squared Error (MSE) | Increase in Uncertainty |
|---|---|---|
| Scan 1 only | 0.11 sq m | — |
| Scans 1 & 2 | 0.08 sq m | 0 of 10000 |
| Scans 1, 2 & 3 | 0.07 sq m | 0 of 10000 |

Figure 13:
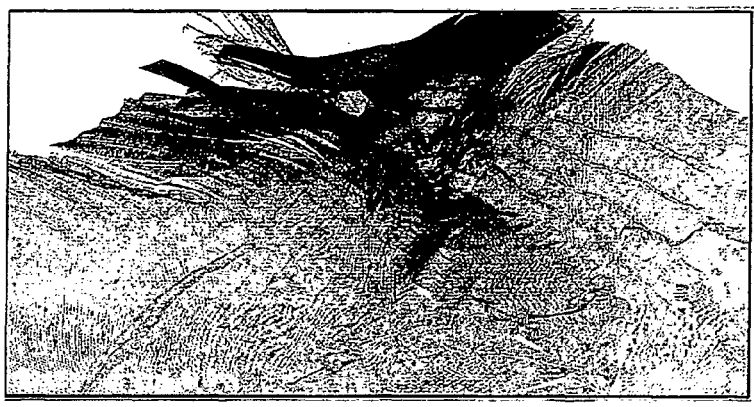
FIG. 13 illustrates the elevation estimation output of a GP fusion algorithm applied to the West Angelas mine dataset.
Figure 14:
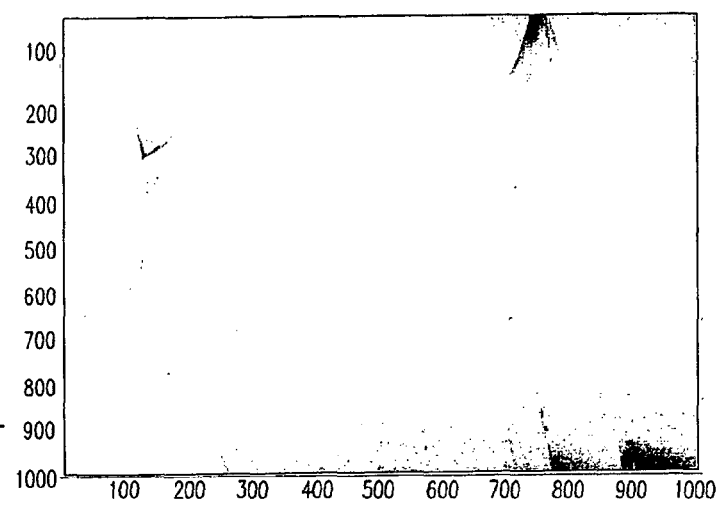
FIG. 14 illustrates confidence of predictions in the GP fusion of FIG. 13.

FIGS. 13 and 14 depict the output obtained on applying the GP fusion methodology detailed hereinabove. In particular FIG. 13 illustrates the elevation estimation output of the GP fusion algorithm applied to the West Angelas mine dataset. FIG. 14 depicts the confidence of the prediction based on the GP fusion method. In FIG. 14, shaded areas depict regions of high standard deviation (uncertainty) and blank areas depict regions of high certainty. Typically, the latter are found in areas where there was data available and the former are found in fringe areas or voids.

Dependent Gaussian Processes

Another way of non-parametric Gaussian process fusion of multiple interrelated datasets exploits correlations between the datasets. In this case, each dataset may be represented by its own individual Gaussian process. Correlation across different datasets is modeled by computing cross-covariances, which is used in order to improve the estimation of one GP given the other GP's.

Consider 'n' datasets (scans for example) from as many sensors (possibly different ones) of a certain space such as a mine pit. Subsets of the data either do-not, partially, or fully overlap. Consider also that each of these datasets can be modeled by an independent individual Gaussian process model using a stationary (squared exponential) kernel. The data can be represented as follows:

$D_i = (x_j, z_j) i = 1 \ldots n$ datasets and $j = 1 \ldots m_i$ data items in dataset $i$ The $x_j$ can represent a two dimensional (x, y) data in case of the terrain modeling application, or could be three dimensional (x, y, z) data in the case of in-ground ore body modeling, for example.

The individual GP models can be represented as:

$$GP_i = N(0, k_i(x, x')) \ i = 1 \ldots n$$

The $k_i(x, x')$ terms represent the kernel/covariance matrices for the observed or given data.

The objective of sensor fusion in the context of Gaussian processes is to estimate the conditional mean and variance in the desired quantity (elevation for instance, in the case of terrain modeling) given all previous datasets—the aforementioned 'n' datasets in this case. Thus, the objective is to estimate the conditional mean and variance in the desired quantity (elevation for instance, in the case of terrain modelling) given all previous datasets, which may be expressed as:

$$E[f_*(x_*)] \ \& \ \text{var}(f_*(x_*))|X_i, GP_i, x_*$$

where i varies from 1 to the number of datasets available (n).

The individual GP's are modeled as hereinbefore described.

The problem here is that while each dataset can be independently modeled using a separate GP, in the context of the single spatial entity that is being modeled (e.g. the mine pit), these datasets are dependent. An estimation process may therefore consider not only the contributions from the individual datasets/models but also the contributions from their mutual dependencies.

In Gaussian process terminology, the problem is of computing the auto-covariance and cross-covariance functions for/between the individual models and using them to estimate the quantity of interest (of the space that is being modeled).

Auto and Cross Covariance Computation

Consider $$GP_i = N(0, k_i(x, x')) \ i = 1 \ldots n$$

Let each kernel $k_i(x, x')$ take the following form $$k_i(x, x') = \sigma_{f_i}^2 \exp\left(-\frac{1}{2}(x - x')^T \Sigma_i (x - x')\right) \quad (13)$$

where $$\Sigma_i = \begin{bmatrix} l_{x_i} & 0 \\ 0 & l_{y_i} \end{bmatrix}^{-2}$$

is the length-scale matrix, a measure of how quickly the modeled function changes in the directions x and y;

$\sigma_{f_i}^2$ is the signal variance.

Further, every dataset/kernel has an associated noise variance denoted as $\sigma_{n_i}^2$. The $\sigma_f^2$ term is optional.

The set of parameters $\{l_{x_i}, l_{y_i}, \sigma_{f_i}, \sigma_{n_i}\}$ are referred to as the hyper-parameters and specify what sort of values the parameters of the model might take. These hyper-parameters can be learnt for each dataset using a Maximum Marginal Likelihood Estimation approach.

The output data can be expressed in the form of a stable linear filter (in this case the GP model over the input data) and is further affected by the noise:

$$Y(s) = U(s) + W(s)$$

where
the process Y(s) represents the output data (elevation data in the case of terrain modeling),
U(s) represents the Gaussian Process (kernel) applied on the input data (x, y in the terrain modeling scenario), and
W(s) represents the noise process (a stationary white Gaussian Noise) associated with each GP.

Figure 15:
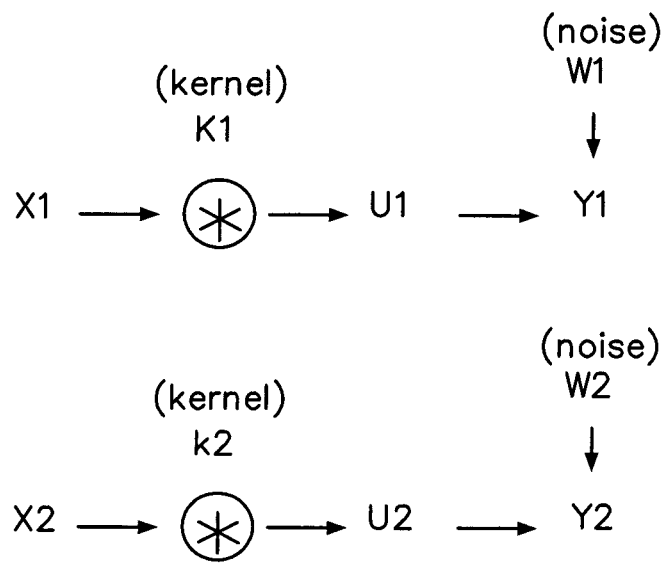
FIG. 15 is a diagram that provides a conceptual example of dependent GP fusion.
Figure 16:
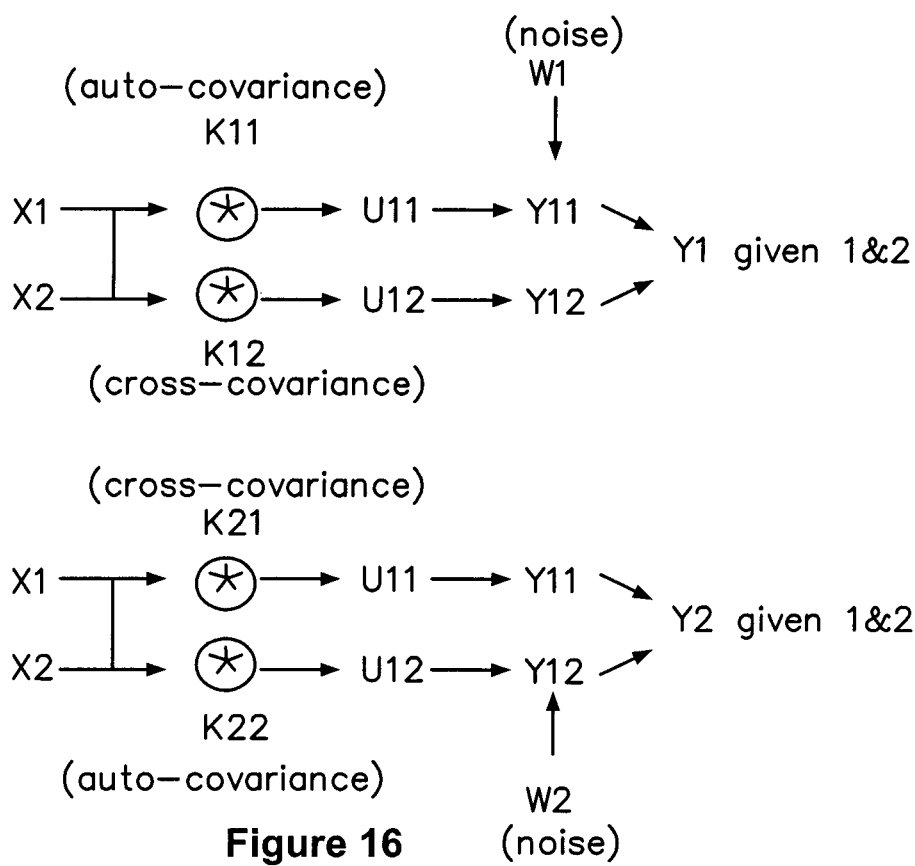
FIG. 16 diagrammatically illustrates the logical equivalent of the dependent Gaussian process fusion of multiple datasets.

Based on this approach, FIG. 15 diagrammatically illustrates two independently modeled Gaussian Processes, and FIG. 16 diagrammatically depicts the dependent Gaussian process fusion methodology detailed below.

The diagram in FIG. 15 provides an introduction to conceptual example of the dependent GP fusion idea. This Figure shows two independent input processes (two separate datasets). Each dataset is modeled using a white noise process (X) convolved with a smoothing kernel (k). The result of that (U) is treated with Gaussian white noise (W) to produce the observed data (Y). The Gaussian process may be expressed as a linear filter in terms of a convolution between an input process (X) and a kernel (k) producing an output process (U). The noise process (W) is also incorporated to yield the output (Y). The output (Y) in the case of a modelling task that fuses two or more data sets represents the single fused model. For example if Y1 and Y2 are both elevation data there may be a single modelling task with a single output Y, representing the estimate of the terrain elevation formed from Y1 and Y2. The output (Y) in the case of a plurality of modelling tasks that use the other data sets as inputs to the Gaussian process will be a plurality of outputs, one for each task. For example, if Y1 to Y4 were modelled, representing elevation and colour (red, green, blue) data, then individual tasks are run for each of the data sets elevation, red, green and blue, each with their own output (Y).

FIG. 16 diagrammatically illustrates the logical equivalent of the dependent Gaussian process fusion of multiple datasets. The fusion problem is formulated as the estimation of a conditional mean (fused estimate) and variance (uncertainty) given the individual GP's. The idea is to improve each estimate (Y1 or Y2) by modeling and using not only the corresponding dataset (done using auto-covariances) but also exploiting the correlation across the different datasets (done using cross-covariances). The conditional mean and uncertainty are computed by taking into account mutual auto-covariances and cross-covariances between the GP's.

Consider, $$K_{ii}^Y = K_{ii}^U + \sigma_i^2 I \quad (14)$$

and $$K_{ij}^Y = K_{ij}^U \quad (15)$$

The auto-covariances of the $i^{th}$ kernel are denoted by $K_{ii}^U$ and the cross-covariances between the $i^{th}$ and $j^{th}$ kernels are denoted by $K_{ij}^U$. The generalized formula to compute both the auto-covariances and cross-covariances is given by $$K_{ij}^U = \frac{(2\pi)^{p/2} \sigma_{f_i} \sigma_{f_j}}{\sqrt{|\Sigma_i + \Sigma_j|}} \exp\left(-\frac{1}{2}(x - x')^T \Sigma_{ij}(x - x')\right) \quad (16)$$

where $$\Sigma_{ij} = \Sigma_i (\Sigma_i + \Sigma_j)^{-1} \Sigma_j$$
$$= \Sigma_j (\Sigma_i + \Sigma_j)^{-1} \Sigma_i$$

p is the dimensionality of the input data, and $$K_{ij}(x - x') = K_{ji}(-(x - x'))$$

Thus, every $K_{ij}^U$ covariance matrix between the $i^{th}$ and $j^{th}$ kernels/datasets is an $m_i \times m_j$ matrix given by $$K_{ij}^U(x_i, x_j) = \begin{bmatrix} K_{ij}(x_{i_1}, x_{j_1}) & \ldots & K_{ij}(x_{i_1}, x_{j_{m_j}}) \\ \vdots & \vdots & \vdots \\ K_{ij}(x_{i_{m_i}}, x_{j_1}) & \ldots & K_{ij}(x_{i_{m_i}}, x_{i_{m_j}}) \end{bmatrix} \quad (17)$$

From these, the $K_{ij}^Y$ can be computed and then $K = K^Y$ can be computed as $$K = \begin{bmatrix} K_{11}^Y & K_{12}^Y & \ldots & K_{1n}^Y \\ K_{21}^Y & \ldots & \ldots & K_{2n}^Y \\ \vdots & \vdots & \vdots & \vdots \\ K_{n1}^Y & \ldots & \ldots & K_{nn}^Y \end{bmatrix} \quad (18)$$

This covariance matrix may be used for Gaussian process regression to estimate the conditional mean elevation and its uncertainty.

Alternative Computation of Auto-Covariances and Cross-Covariances

In alternative embodiments to those the use equation 16, additional flexibility in the dependent GP modelling process may be obtained by adding a term $K_f$ to the computation of the auto-covariance and cross-covariance that models the task similarity between individual tasks. For an output to be predicted of i, which may vary from 1 to nt, the auto-covariance and cross-covariance can then be specified as $$K_{ij}^U(x, x') = K_f * |\Sigma_i + \Sigma_j|^{-\frac{1}{2}} \exp\left(-\frac{1}{2}(x-x')^T \Sigma_{ij}(x-x')\right) \quad (16A)$$

In equation 16A each term has its same definition as described above for equation 16.

$K_f$ is a symmetric matrix of size nt*nt and is learnt along with the other GP hyperparameters. It therefore provides increased flexibility to account for similarities between datasets over the cross-covariance. The covariance matrix term $K(X,X)$ in Equation 12 is then specified as $$K = \begin{bmatrix} K_{11}^Y & K_{12}^Y & \ldots & K_{1nt}^Y \\ K_{21}^Y & \ldots & \ldots & \vdots \\ \vdots & \vdots & \vdots & \vdots \\ K_{nt1}^Y & \ldots & \ldots & K_{ntnt}^Y \end{bmatrix} \quad (16B)$$

where $$K_{ii}^Y = K_{ii}^U + \sigma_i^2 I \quad (16C)$$

$$K_{ij}^Y = K_{ij}^U \quad (16D)$$

$K_{ii}^Y$ represents the auto-covariance of the ith data set with itself and $K_{ij}^Y$ represents the cross covariance between the ith and jth data sets. They also take the noise components of the data sets into consideration and are obtained as in equations 16C and 16D respectively. $K(X_*, X_{nt})$ denotes the covariance between the test data and the sets of input data (from the individual data sets) that are used for GP regression. It is given by $$K(X_*, X) = [K_{i1}^U(X_*, X_1), K_{i1}^U(X_*, X_2), \ldots, K_{int}^U(X_*, X_{nt})] \quad (16E)$$

As stated above, i is the output to be predicted—it can vary from 1 to nt. $K(X_*, X_*)$ represents the a priori covariance of the test points and is specified by $$K(X_*, X_*) = K_{ii}^U(X_*, X_*) + \sigma_i^2 \quad (16F)$$

The noise term is added assuming the test points are as noisy as the data points of the ith GP. Finally, z represents the sets of z data corresponding to the training data taken from each of the data sets.

$$z = [z_1, z_2, \ldots, z_{nt}] \quad (16G)$$

The hyperparameters of the system that need to be learnt are nt*(number of hyperparameters per kernel), so that the number of hyperparameters varies depending on the choice and definition of the kernel. In addition nt noise values are to be learnt, corresponding to the noise in the observed data sets. In the context of modeling a single terrain using multiple and multimodal data sets, for each point, the GP that is spatially closest to the test point is chosen for performing GP regression. The regression takes into account spatial correlation with other data sets as described.

Fusion Gaussian Process Regression

The fusion Gaussian process regression equations are given as follows:

$$\bar{f}_* = k_*^T K^{-1} z \quad (19)$$

and variance $$V[f_*] = k(x_*, x_*) - k_*^T K^{-1} k_* \quad (20)$$

The equations are essentially the same as the standard Gaussian process regression equations discussed hereinabove. Note that K above corresponds to the $K + \sigma_n^2 I$ in the standard form. The only difference being that multiple datasets (and hence multiple Gaussian processes) are involved and hence the covariance terms are modified according to equation (17) and as described previously in equations 16E and 16F:

$$k_*^T = [K_{i1}^Y(x_*, X_{11}), \ldots, K_{i1}^Y(x_*, X_{1m_1}), \ldots, K_{in}^Y(x_*, X_{nm_n})] \quad (21)$$

where $X_{1m_1} \equiv m_i^{th}$ data point of the training data for the first dataset/first GP and so on, and $$k(x_*, x_*) = K_{ii}^U(x_*, x_*) + \sigma_n^2 I \quad (22)$$

z represents the vector of outputs for the training data from the different GP's. For the last two equations, any one value of i may be used.

Figure 17:
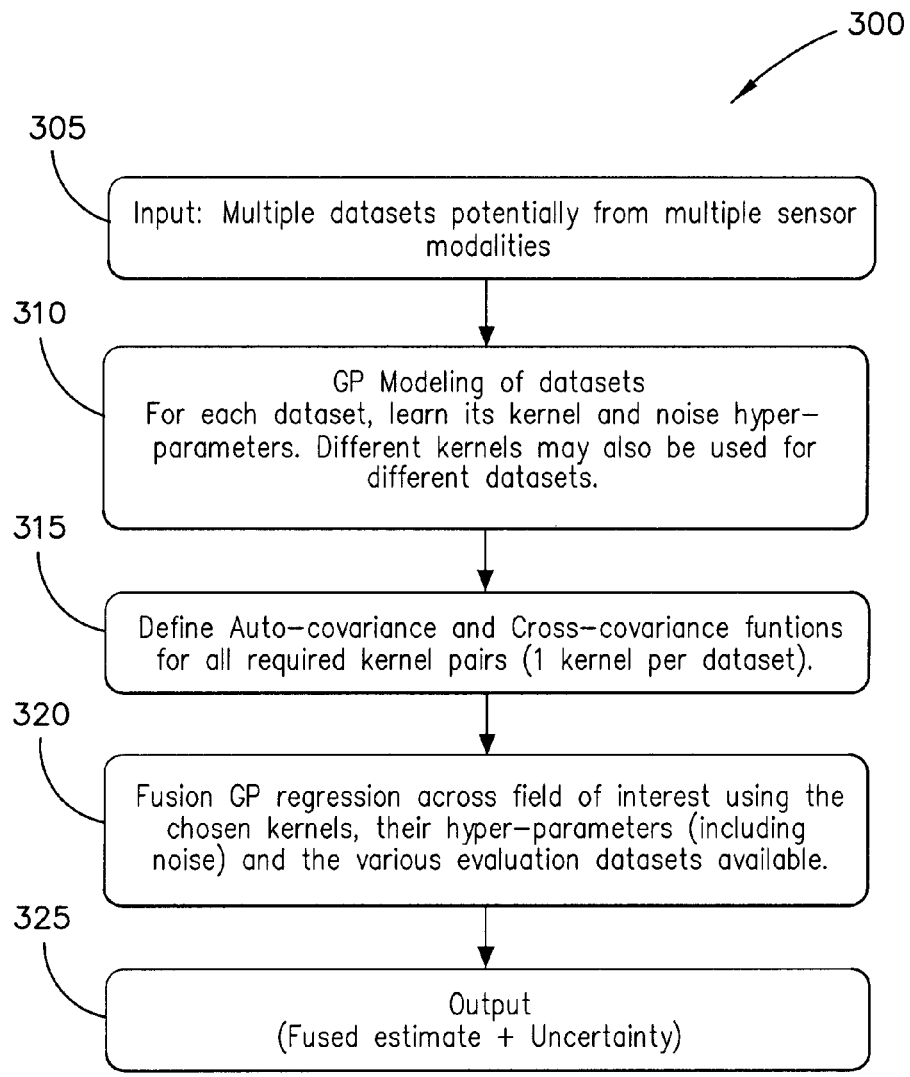
FIG. 17 shows a procedure for dependent Gaussian process fusion in the form of a flow-chart diagram.

FIG. 17 shows a procedure 300 for dependent Gaussian process fusion in the form of a flow-chart diagram. Once again the input (305) consists of multiple datasets potentially from multiple sensor modalities. The Gaussian process modeling of the multiple datasets occurs at step 310. For each dataset the procedure learns the respective kernel and noise hyper-parameters. Different kernels may be used for different datasets. In order to account for correlations between the different datasets auto-covariance and cross-covariance functions are defined (315) for all required kernel pairs (one kernel per dataset). Fusion GP regression may then be performed (320) across a field of interest using the chosen kernels, their hyper-parameters (including noise) and the various evaluation datasets available. The resulting output (325) comprises the fused data estimate and associated uncertainty taking into account the multiple datasets and their inter-dependencies.

Experimental results from applying the dependent Gaussian process fusion technique to simple datasets are shown in FIGS. 18-27. The Gaussian process used the squared exponential covariance function described above herein.

FIGS. 18, 19, 20 and 21 represent a simple test done on a artificial two-dimensional data. The Gaussian process parameters were learnt apriori, and two sets of "good" GP hyperparameters were tested using an identical dataset for both. The mean squared error across a set of selected input points was computed and are listed in Table III. The results showed the fused GP performed better than either of the GP's taken standalone.

TABLE III

Fusion Tests: Mean squared Error

| Case | GP1 MSE (units) | GP2 MSE (units) | Fusion MSE (units) |
|---|---|---|---|
| sample2a (without voids) | 0.0473 | 0.0737 | 0.0233 |
| sample2 (with voids) | 0.0333 | 0.0898 | 0.0186 |
| sample3b (with voids) | 0.0015 | 0.0021 | 0.0004 |
| sample3 (without voids) | 0.0019 | 0.0021 | 0.0009 |

Figure 18:
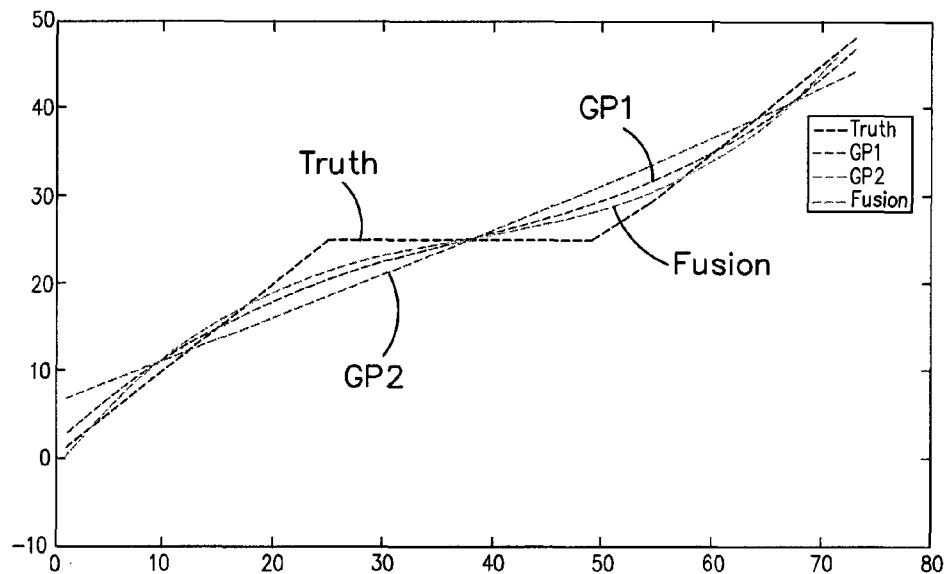
FIGS. 18, 19, 20 and 21 illustrate experimental results for dependent Gaussian process fusion performed on artificial two-dimensional data.
Figure 19:
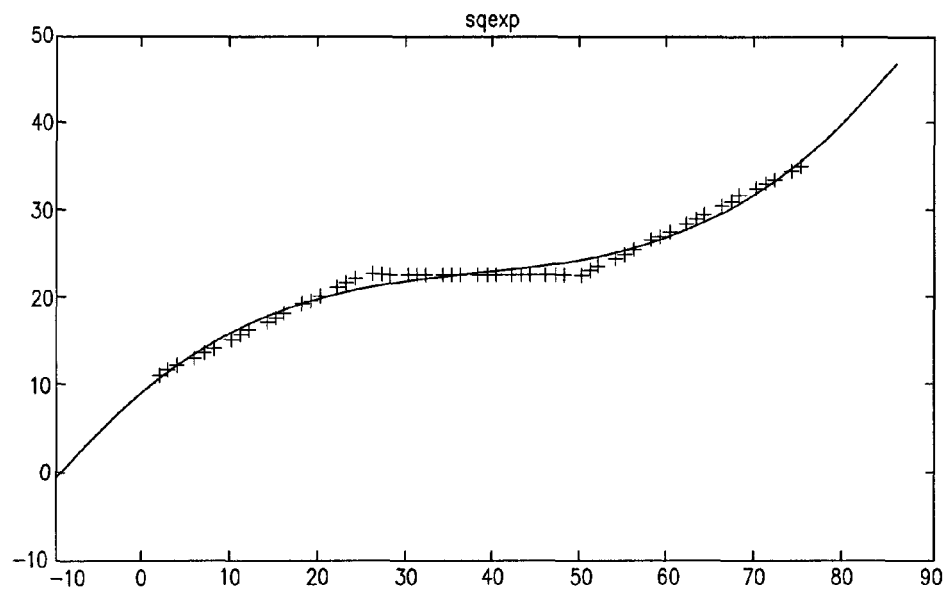

With reference to the table above, FIG. 18 illustrates the sample2a dataset case (without voids) estimated outputs for the points used for mean squared error (MSE) computation obtained using the individual GP's as well as after GP fusion. The ground truth for these points is also depicted. FIG. 19 shows the sample2a dataset (without voids) and the estimated GP fusion output for a generated set of test data overlayed on given data (represented by the "+" marks).

Figure 20:
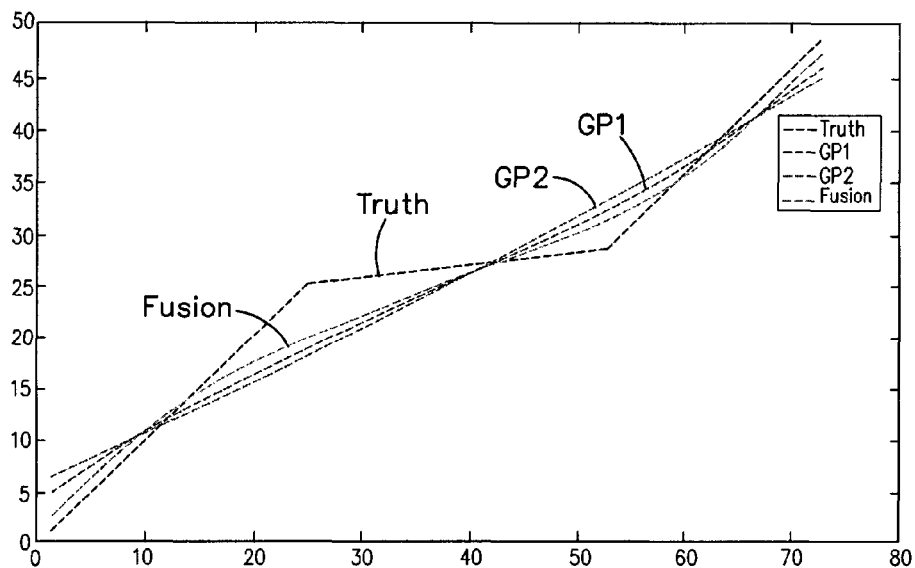
Figure 21:
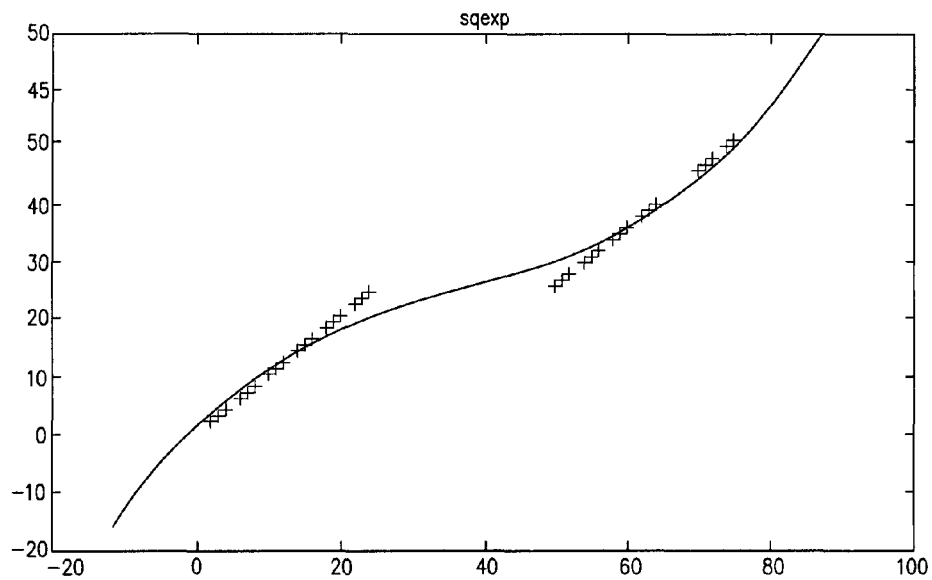

FIG. 20 illustrates the sample2 dataset case (with voids) estimated outputs for the points used for mean squared error (MSE) computation obtained using the individual GP's as well as after GP fusion, as well as the ground truth. FIG. 21 shows the sample2 dataset (with voids) and the estimated GP fusion output for a generated set of test data overlayed on given data (represented by the "+" marks).

Figure 22:
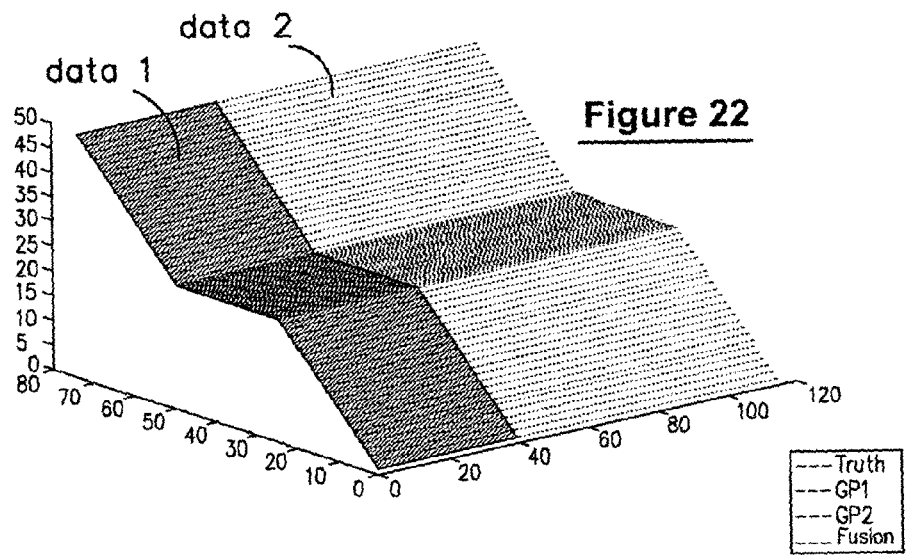
FIGS. 22-24 illustrate experimental results for dependent Gaussian process fusion performed on artificial three-dimensional data without voids.
Figure 23:
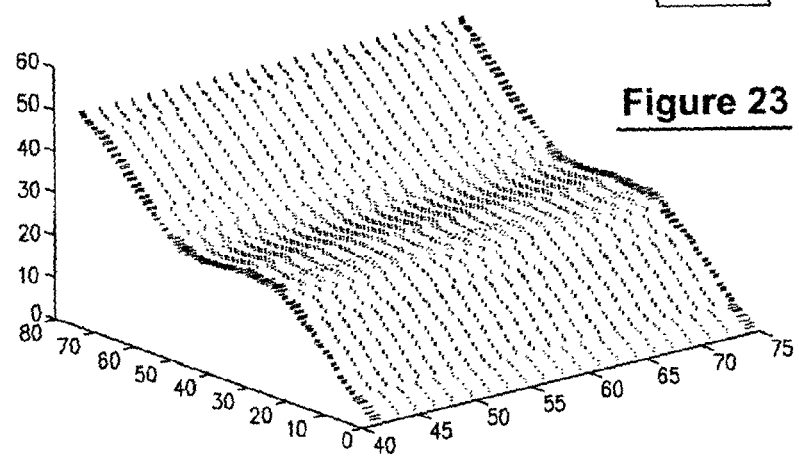
Figure 24:
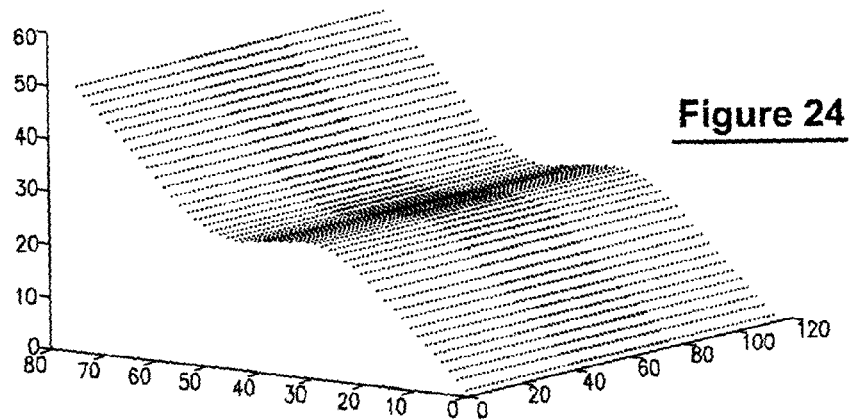
Figure 25:
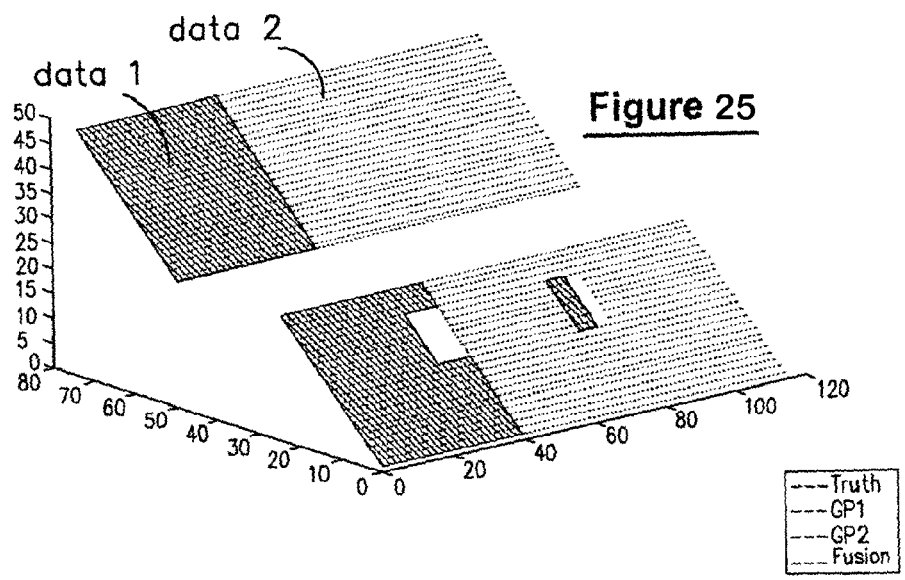
FIGS. 25-27 illustrate experimental results for dependent Gaussian process fusion performed on artificial three-dimensional data with voids.
Figure 26:
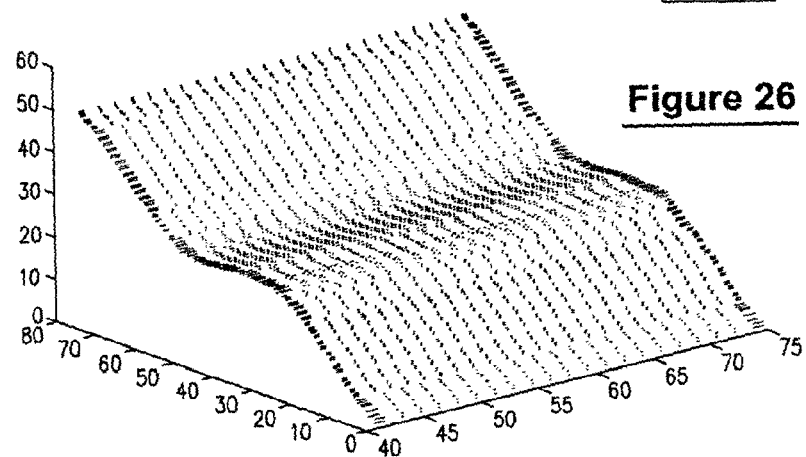
Figure 27:
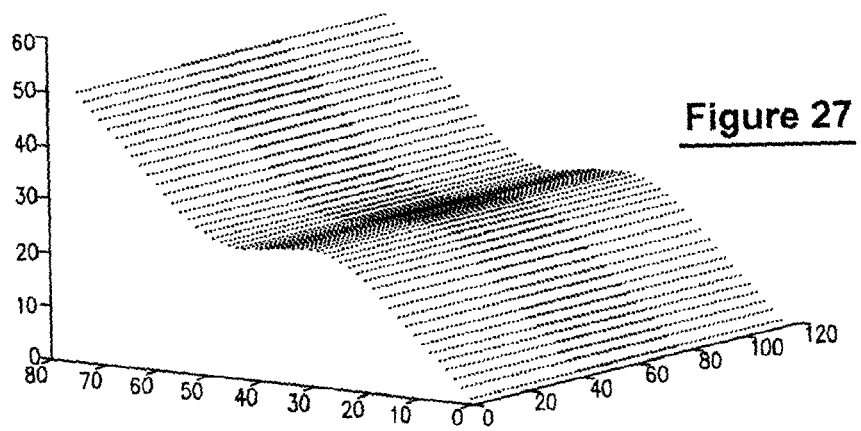

FIGS. 22 and 25 depict two artificial three-dimensional datasets—one with voids present and the other a complete picture. Each of them depicts two datasets (data1, data2) which are separately modeled using the methods described hereinabove. The two GP's along with the two datasets in each case were fused. The results in the former case are depicted in FIGS. 23 and 24, and those of the latter case are depicted in FIGS. 26 and 27. The mean squared error was computed in a portion of the data that was common to the two datasets, and are listed in Table III. Clearly, in each case, the individual GP's do not model the data as well as the GP's taken together. The MSE in the common region decreases as a result of the extra information available from the second shifted dataset and hence validating the fusion algorithms working.

Figure 28:
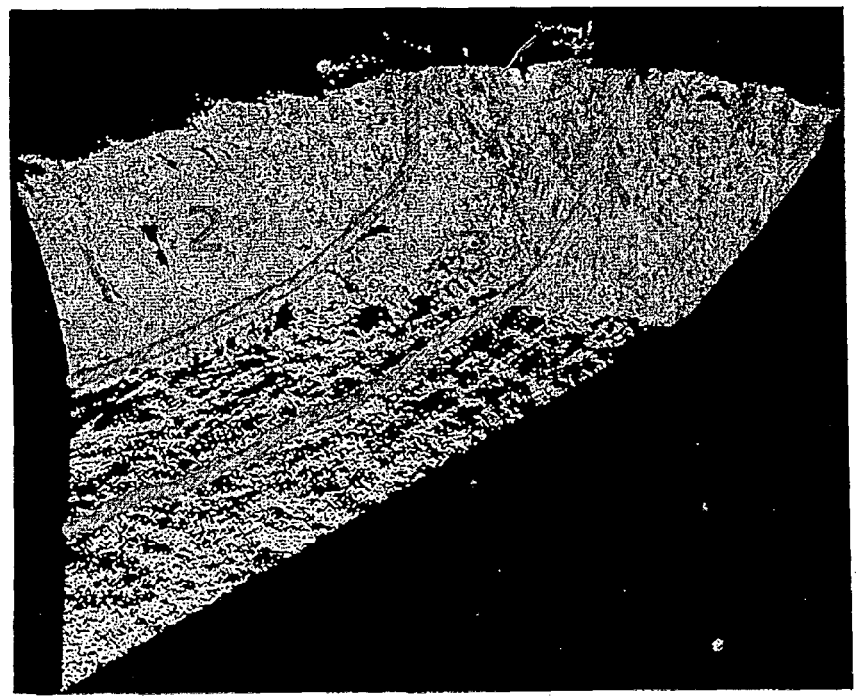
FIG. 28 shows a section of a laser scan of terrain.

Additional Experiment: Demonstration of Color as a Modelling Variable Using Squared Exponential Kernel A small section of a RIEGL laser scan taken at Mt Tom Price mine, Western Australia was taken for this experiment. The data set was split into 3 parts as shown in FIG. 28. The characteristics of each of these parts are listed in Table IV. This data set has both color (RGB) and elevation information for each point.

The color information may be useful for various purposes, depending on the particular application of the modelling task and the data to be modeled. For example, the human eye responds well to color representations so that use of color may facilitate human interpretation of a model, color may be used in automatic classification or identification algorithms implemented in software, which by run by an autonomous vehicle. In at least some circumstances adding color may improve the accuracy of modelling of other variables, due to exploitation of any cross-correlation between color and the other variable.

TABLE IV

Mt. Tom Price Scan Data

| Subset of data | Number of points | Size of subset (in m) |
|---|---|---|
| Whole data (tp0) | 151990 | 27.75 X 52.75 X 11.48 |
| Patch 1 (tp 1) | 39385 | 8.44 X 52.64 X 10.60 |
| Patch 2 (tp 2) | 63328 | 9.31 X 25.00 X 10.82 |
| Patch 3 (tp 3) | 49277 | 26.59 X 49.18 X 11.23 |

Figure 29:
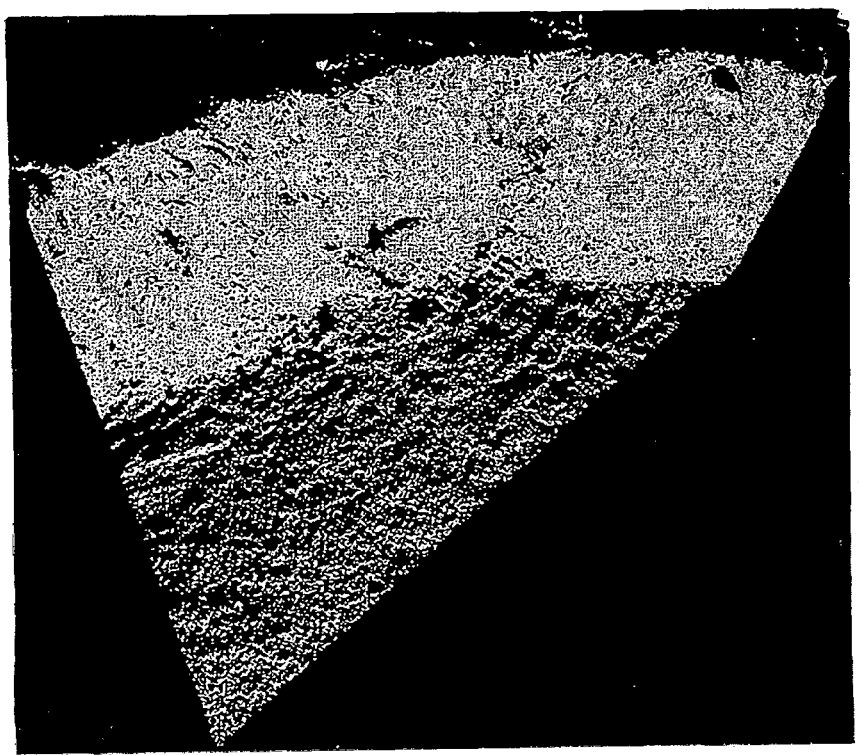
FIG. 29 shows a model of the terrain shown in FIG. 28, formed using a squared exponential kernel.

FIG. 29 shows the result of the multi-output GP modelling (MOGP) based on equations 16A to 16E for both color and elevation data. In alternatively embodiments, the modelling of color may alternatively have been performed using a multi-output GP modelling process without the additional term $K_f$ described in relation to equation 16A, for instance using equation 16 described above. In still further alternative embodiments, color may be a variable in the dependent GP modelling task described in relation to equation 16.

The RGB and z data of 2550 points (50 points along with 50 of their nearest neighbours) were used to train a four-task MOGP. GP learning used the KD-tree block learning procedure described above, including the local approximation method. This GP was tested on 100000 points uniformly selected from the data set. The test points were different from the training ones and used exclusively for testing. The MSE between the predicted between and the known (ground-truth) elevation and color values and those predicted by the GP were 0.0524 sqm for elevation and 0.0131, 0.0141 and 0.0101 squared units for red, green and blue respectively. From FIGS. 28 and 29 it can be seen that the shades of grey are also effectively reproduced in the GP output.

The scalability of the approach is demonstrated in that learning 4 tasks using 2550 points each is akin to learning a GP with 10,200 data points. This was learnt in 2.75 hours using random starting points for the optimization process and GP inference for the 100,000 points took just about 12.25 minutes. These results were obtained using a standard desktop computer with an 8 core processor.

Additional Experiment: Overlapping and Mutually Exclusive Data Sets

Data fusion using multiple data sets which may or may not overlap was also tested. The three parts of the Tom Price scan referred to above were used to emulate these scenarios when using a single sensor. In this experiment, a dependent GP formalism (DGP), as described above under the heading Joint Hyperparameter Learning, was used to conditionally estimate elevation across a field of interest spanning the data set, given the different data sets to be fused. Two cases were tested—(1) patch 2 was fused with the data set and (2) patch 1 was fused with patch 2.

The first case represents a scenario where a sensor provides the whole dataset in one instance whereas in the second instance, it is able to provide data in only a small section of the site. The objective is to fuse these overlapping data sets to provide a single integrated model of the terrain.

The second case represents a scenario where a perceptually limited sensor (with limited range for instance) provides data spanning small sections of the site being modeled. The objective is to use the available non-overlapping datasets to develop an integrated model that can provide a reasonable elevation estimate even in areas where data has not been observed.

TABLE V

DGP output for the Mt Tom Price Scan Data
See Figure 28 and Table IV

| Fusion case | MSE (sq. m) 10000 points | MSE (sq. m) 10000 points | MSE (sq. m) 49277 points |
|---|---|---|---|
| tp0 and tp2 | 0.0495 (tp0) | 0.0609 (tp2) | 0.0518 (tp3) |
| tp1 and tp2 | 0.0187 (tp1) | 0.0627 (tp2) | 1.8124 (tp3) |

Figure 30A:
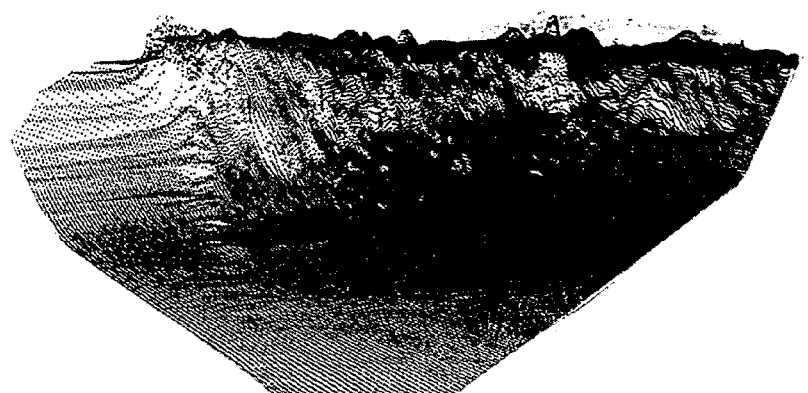
FIG. 30a shows an experimental output for overlapping data sets, formed using the squared exponential kernel.
Figure 30B:
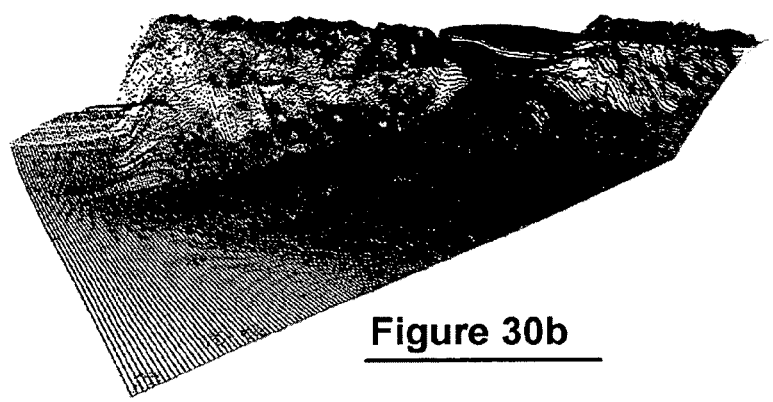
FIG. 30b shows an experimental output for non-overlapping data sets, formed using the squared exponential kernel.
Figure 30C:
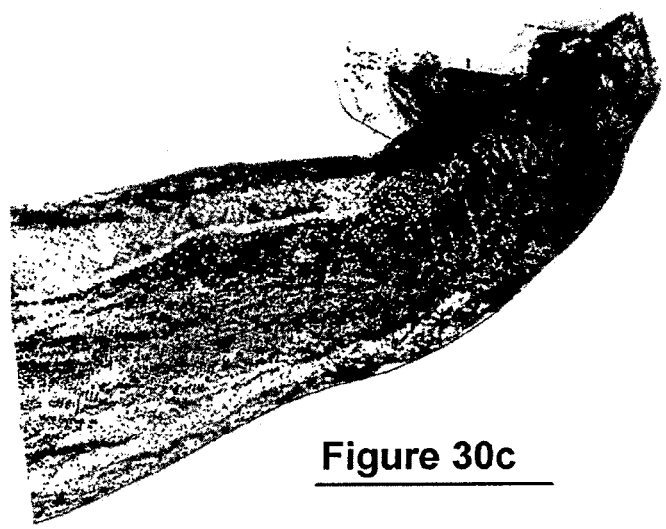
FIG. 30c represents the consistency a third data set when non-overlapping data sets are modeled, using the squared exponential kernel.

The results of this experiment are summarized in Table V and FIG. 30a-c. FIG. 30a shows the output when the entire dataset is fused with patch 2 of the same data set (overlapping data sets), FIG. 30b shows the output when patches 1 and 2 are fused to predict the model for the entire dataset (non-overlapping data sets) and FIG. 30c represents the consistency of patch 3 in the non-overlapping case of fusing patches 1 and 2. The ground-truth (red points) are close to the GP predictions (blue points).

In both cases, 50 training points along with 50 of each of their nearest neighbours were used for training the GP. In each case, 10000 points were sampled from the input data sets (tp0 and tp2 in the first case; tp1 and tp2 in the second case) and all 49277 points of patch 3 (tp3) were used for testing the GP model by computing the MSE. 100000 artificially generated points spanning the data set were used to instantiate the GP and observe the output at a chosen resolution over a given area. FIG. 30a-c also shows an output image showing the consistency of the DGP model over patch 3 in the non-overlapping data set fusion case. The ground truth elevation data over patch 3 are clearly close to the GP predictions and well within the 2σ confidence bounds of the GP prediction. Note that the MSE over patches 2 and 3 are reduced in the overlapping data set case due to the overlap of points. The point to be noted from the MSE values is the ability of the DGP model to successfully fuse multiple single sensor data sets which may or may not overlap.

Additional Experiment: Neural Network Kernel

Figure 31:
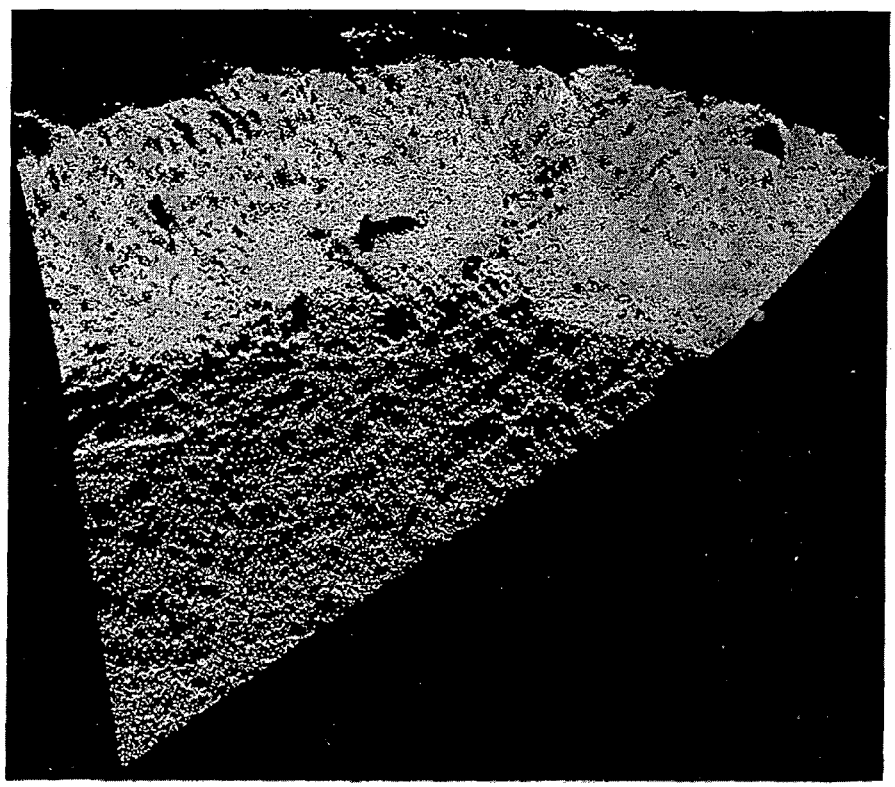
FIGS. 31 and 32a-c show experimental outputs for a neural network kernel, corresponding to the outputs in FIGS. 29 and 30a-c respectively.
Figure 32A:
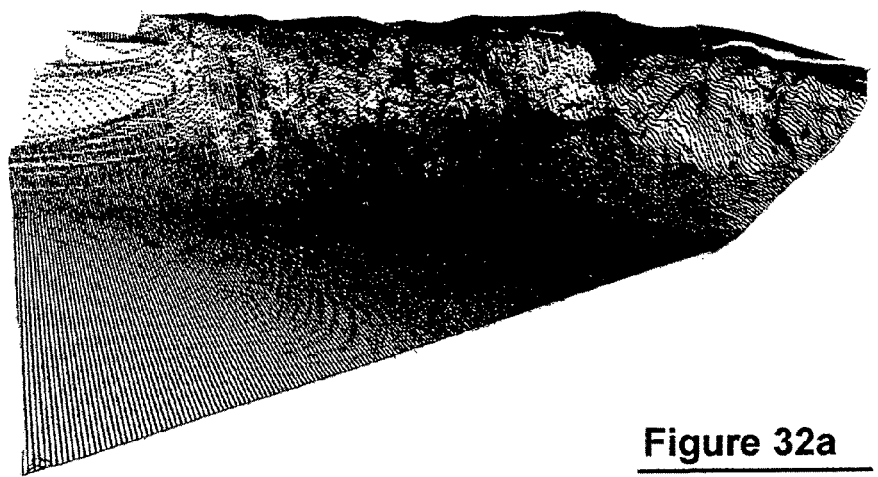
Figure 32B:
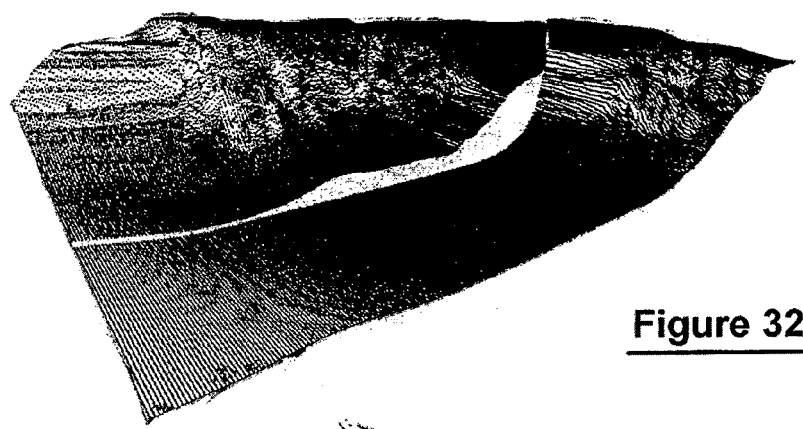
Figure 32C:
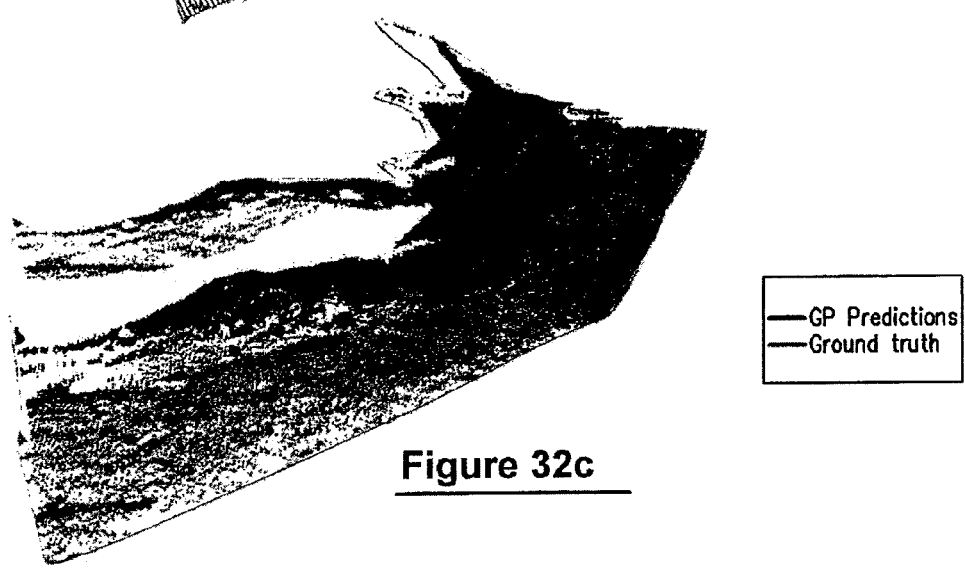

FIGS. 31 and 32a-c represent experimental results using the same Mt Tom Price mine laser data as presented above, using the neural network kernel described above. FIG. 31 is the resulting output which corresponds to FIG. 29 for the squared exponential kernel and FIGS. 32a-c correspond to the output represented in FIGS. 30a-c.

In the foregoing description, Gaussian processes are used to model large scale and complex terrain. The techniques described include a new approach to fusing multiple, multi-modal sensory datasets towards obtaining a comprehensive model of the terrain under consideration. The fusion technique itself is generic and applicable as a general Gaussian process fusion methodology. Experiments conducted in simulation as well as using real datasets obtained from GPS and Laser scanner based surveys in real application scenarios (mining) clearly suggest the viability of the proposed techniques. The resulting models obtained naturally provide a multi-resolution representation of large scale terrain, effectively handle both uncertainty and incompleteness in a statistically sound way, provide a powerful basis to handle correlated spatial data in an appropriate manner and finally, provide a statistically correct means of overcoming the limited perceptual capabilities of sensors used in large scale field robotics scenarios.

Throughout this specification, unless the context requires otherwise, the word "comprise", or variations such as "comprises" and "comprising", will be understood to imply the inclusion of a stated integer or group of integers but not the exclusion of any other integer or group of integers.

The foregoing detailed description of the present invention has been presented by way of example only and is not intended to limit the scope of the invention which includes each and every novel feature and combination of novel features herein disclosed.

What is claimed is:

1. A method of computerised data analysis and synthesis comprising:
   receiving first and second datasets relating to a quantity of interest within a domain, each dataset comprising a plurality of datapoints;
   storing, in a data storage, the first and second datasets;
   generating, using a training processor, a Gaussian process model by using the first and second datasets to compute optimized kernel and noise hyperparameters;
   storing, in the data storage, the optimized kernel and noise hyperparameters; and
   using an evaluation processor, applying the Gaussian process model by using the stored first and second datasets and hyperparameters to perform Gaussian process regression to compute estimates of unknown values of the quantity of interest within the domain;
   wherein generating the Gaussian process model includes, in the training processor:
      using the first dataset to learn optimized kernel hyperparameters and a first noise hyperparameter, and
      using the learnt kernel hyperparameters and second dataset to learn an optimized second noise hyperparameter; and
   wherein Gaussian process regression is performed using the first and second datasets, first and second noise hyperparameters and kernel hyperparameters.

2. The method of claim 1 wherein the first and second datasets are formed using different measurement sensors.

3. The method of claim 1 wherein the first and second datasets are formed using the same measurement sensor at different times or locations.

4. The method of claim 1 wherein the quantity of interest is geographical elevation.

5. The method of claim 4 wherein the domain is a mining region.

6. The method of claim 1 wherein the quantity of interest is a geological characteristic within a body of earth.

7. The method of claim 1 including a plurality of datasets wherein a separate noise hyperparameter is computed for each using the same optimized kernel hyperparameters.

8. The method of claim 1 wherein the first and second datasets are stored in a kd-tree data structure.

9. The method of claim 1 wherein generating a Gaussian process mode includes using the first dataset to learn first kernel and noise hyperparameters, using the second dataset to learn second kernel and noise hyperparameters, and using the first and second kernel and noise hyperparameters to compute both auto-covariances and cross-covariances; and
   wherein Gaussian process regression is performed using the first and second datasets, first and second kernel and noise hyperparameters and computed auto-covariances and cross-covariances.

10. The method of claim 9 wherein different Gaussian process kernels are used with respect to the first and second datasets.

11. The method of claim 9 wherein the same Gaussian process kernel is used with respect to the first and second datasets.

12. The method of claim 9, wherein the first and second datasets describe different quantities and the quantity of interest is the quantity described by the first dataset and wherein computation of the auto-covariance and cross-covariance includes computing a measure of task similarity with the computation of the hyperparameters.

13. The method of claim 9, wherein the first and second datasets describe the same quantity of interest and computation of the auto-covariance and cross-covariance includes computing a measure of dataset similarity with the computation of the hyperparameters.

14. The method of claim 1, wherein the first dataset comprises color data.

15. The method of claim 14, wherein the second dataset comprises data other than color data.

16. A system for analysing and synthesising data to estimate a quantity of interest, comprising:
    a training processor adapted to
        obtain and store first and second datasets, each comprising a plurality of datapoints, representing separate sets of measurements or indicators of the quantity of interest within a domain,
        generate a Gaussian process model by using,
            the first dataset to learn optimized kernel hyperparameters and a first noise hyperparameter, and the
            learnt kernel hyperparameters and the second dataset to learn a second noise hyperparameter;
    data storage in communication with the training processor, wherein the training processor is adapted to store in the data storage the first and second datasets and computed hyperparameters, and
    an evaluation processor in communication with the data storage, the evaluation processor adapted to apply the Gaussian process model by performing Gaussian process regression using both the first and second datasets, respective first and second noise hyperparameters, and kernel hyperparameters to compute estimates of unknown values of the quantity of interest within the domain.

17. The system of claim 16 including at least one sensor for generating sets of measurements comprising the datapoints of the first and second datasets.

18. The system of claim 17 wherein the first and second datasets are derived from the same sensor.

19. The system of claim 16 including a plurality of sensors for generating sets of measurements, wherein the first and second datasets are derived from different sensors.

20. The system of claim 16, wherein the quantity of interest is geographical elevation.

21. The system of claim 20 wherein the domain is a mine pit.

22. The system of claim 16 wherein the quantity of interest is a geological characteristic within a body of earth.

23. The system of claim 16 wherein the data storage includes a kd-tree data structure for storage and access to the first and second datasets.

24. The system of claim 16:
    wherein the training processor is adapted:
        to use the first dataset to compute first kernel and noise hyperparameters, and
        to use the second dataset to compute second kernel and noise hyperparameters and,
        to use the first and second kernel and noise hyperparameters to compute both auto-covariances and cross-covariances; and
    wherein the evaluation processor is adapted to use the first and second datasets, first and second kernel and noise hyperparameters and computed auto-covariances and cross-covariances for Gaussian process regression.

25. The system of claim 24 wherein the evaluation processor is adapted to use different Gaussian process kernels with respect to the first and second datasets.

26. The system of claim 24 wherein the evaluation processor is adapted to use the same Gaussian process kernel with respect to the first and second datasets.

27. The system of claim 24, wherein the first and second datasets describe different quantities and the quantity of interest is the quantity described by the first dataset and wherein the training processor is adapted to compute the auto-covariance and cross-covariance by computing a measure of task similarity with the computation of the hyperparameters.

28. The system of claim 24, wherein the first and second datasets describe the same quantity of interest and the training processor is adapted to compute the auto-covariance and cross-covariance by computing a measure of dataset similarity with the computation of the hyperparameters.

29. The system of claim 16, wherein the first dataset comprises color data.

30. The system of claim 29, wherein the second dataset comprises data other than color data.

* * * * *